United States Patent
Yanamadala et al.

(10) Patent No.: US 12,118,088 B2
(45) Date of Patent: Oct. 15, 2024

(54) MODERATOR SYSTEM FOR A SECURITY ANALYTICS FRAMEWORK

(71) Applicant: Arm Limited, Cambridge (GB)

(72) Inventors: Subbayya Chowdary Yanamadala, Dallas, TX (US); Jeremy Patrick Dubeuf, Antibes (FR); Carl Wayne Vineyard, Leander, TX (US); Matthias Lothar Boettcher, Cambridge (GB); Hugo John Martin Vincent, Cambridge (GB); Shidhartha Das, Upper Cambourne (GB)

(73) Assignee: ARM LIMITED, Cambridge (GB)

( * ) Notice: Subject to any disclaimer, the term of this patent is extended or adjusted under 35 U.S.C. 154(b) by 230 days.

(21) Appl. No.: 16/855,716

(22) Filed: Apr. 22, 2020

(65) Prior Publication Data

US 2021/0334373 A1    Oct. 28, 2021

(51) Int. Cl.
*G06F 21/56* (2013.01)
*G06F 9/54* (2006.01)
*G06F 21/72* (2013.01)
*G06F 21/85* (2013.01)

(52) U.S. Cl.
CPC .............. *G06F 21/566* (2013.01); *G06F 9/54* (2013.01); *G06F 21/72* (2013.01); *G06F 21/85* (2013.01); *G06F 2221/034* (2013.01)

(58) Field of Classification Search
CPC .......... G06F 21/566; G06F 9/54; G06F 21/72; G06F 21/85; G06F 2221/034
See application file for complete search history.

(56) References Cited

U.S. PATENT DOCUMENTS

| | | | |
|---|---|---|---|
| 9,411,009 B1* | 8/2016 | Aguayo Gonzalez . | G01R 21/00 |
| 9,503,481 B2* | 11/2016 | Doctor ................... | H04L 63/20 |
| 10,387,646 B2* | 8/2019 | Samat ................. | G06F 11/3058 |
| 11,200,312 B1* | 12/2021 | Greve ..................... | G06F 13/24 |
| 11,444,919 B2* | 9/2022 | de Bes ................ | H04L 63/0209 |
| 2014/0143826 A1* | 5/2014 | Sharp ..................... | H04L 63/102 |
| | | | 726/1 |
| 2014/0245446 A1* | 8/2014 | Shanmugavelayutham ................ | |
| | | | G06F 21/54 |
| | | | 726/24 |
| 2015/0373043 A1 | 12/2015 | Wang et al. | |
| 2017/0053140 A1* | 2/2017 | Loubet Moundi ...... | G06F 21/75 |
| 2017/0083702 A1* | 3/2017 | Gathala ................. | G06F 21/552 |
| 2017/0176524 A1* | 6/2017 | Dewan .............. | G01R 31/3172 |

(Continued)

OTHER PUBLICATIONS

Facon et al. "Hardware-enabled AI for embedded security: A new paradigm". IEEE 2019 3rd International Conference on Recent Advances in Signal Processing, Telecommunications & Computing. Mar. 2019. p. 80-84. (Year: 2019).*

(Continued)

*Primary Examiner* — Han Yang
*Assistant Examiner* — Zhe Liu
(74) *Attorney, Agent, or Firm* — Talem IP Law, LLP

(57) ABSTRACT

A moderator system that can receive outputs of various stages of the security analytic framework and can receive input from external sources to provide information about emerging styles of attacks. One or more models/behavioral profiles can be curated by the moderator system, and the moderator system can provide updates to components of the security analytics framework.

18 Claims, 17 Drawing Sheets

(56) References Cited

U.S. PATENT DOCUMENTS

| | | | |
|---|---|---|---|
| 2017/0177460 A1* | 6/2017 | Neiger | G06F 11/3024 |
| 2017/0230418 A1 | 8/2017 | Amar et al. | |
| 2017/0236125 A1* | 8/2017 | Guise | H04W 12/12 |
| | | | 705/17 |
| 2017/0249099 A1* | 8/2017 | Jun | G06F 21/71 |
| 2017/0339178 A1* | 11/2017 | Mahaffey | H04L 41/142 |
| 2018/0288097 A1* | 10/2018 | Poornachandran | G06F 21/55 |
| 2018/0316711 A1* | 11/2018 | Iyer | H04W 12/126 |
| 2018/0357012 A1* | 12/2018 | Colombo | G06F 15/177 |
| 2018/0373956 A1* | 12/2018 | Yamato | G06F 13/00 |
| 2019/0042388 A1* | 2/2019 | Wang | G06F 13/1668 |
| 2019/0138719 A1* | 5/2019 | Sultana | G06N 20/10 |
| 2019/0182287 A1* | 6/2019 | Hanley | H04L 63/20 |
| 2019/0297096 A1 | 9/2019 | Ahmed et al. | |
| 2019/0347423 A1* | 11/2019 | Sanossian | H04L 41/0853 |
| 2019/0370473 A1* | 12/2019 | Matrosov | G06F 21/577 |
| 2019/0373007 A1* | 12/2019 | Salunke | G06F 11/3447 |
| 2020/0267057 A1* | 8/2020 | Garvey | H04L 41/0654 |
| 2021/0012239 A1* | 1/2021 | Arzani | G06N 20/00 |
| 2021/0064761 A1* | 3/2021 | Kawakita | G06F 21/44 |

OTHER PUBLICATIONS

Wang, et al. "Hardware performance counter-based malware identification and detection with adaptive compressive sensing." ACM Transactions on Architecture and Code Optimization. Mar. 28, 2016. p. 1-23. (Year: 2016).*

International Search Report and Written Opinion issued in Application No. PCT/GB2021/050910, Mailed Jul. 8, 2021, 14 pages.

* cited by examiner

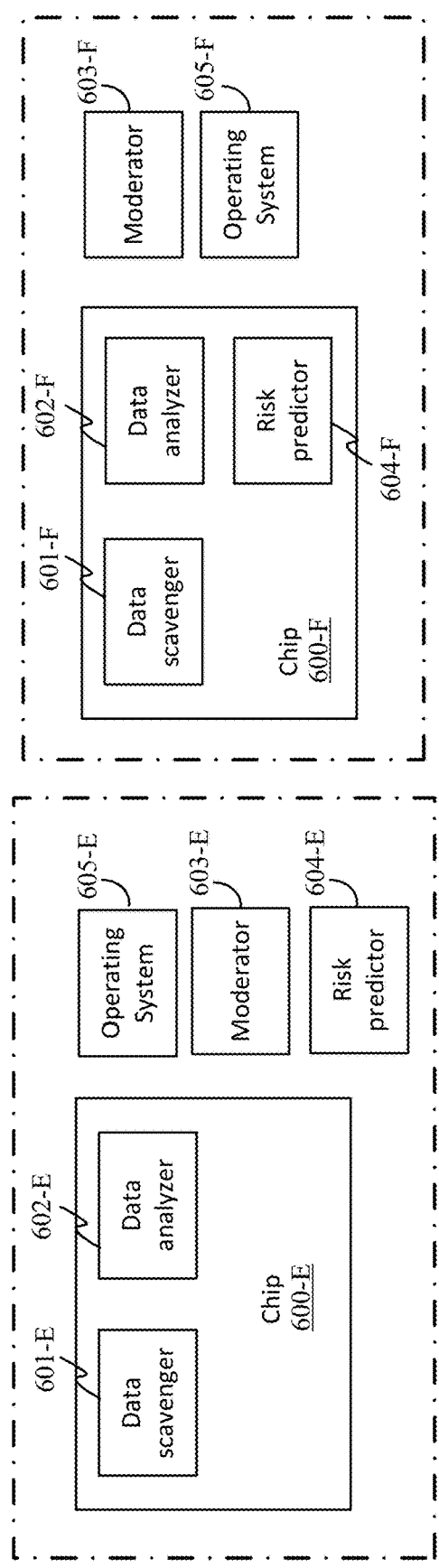
Figure 6E
Figure 6F
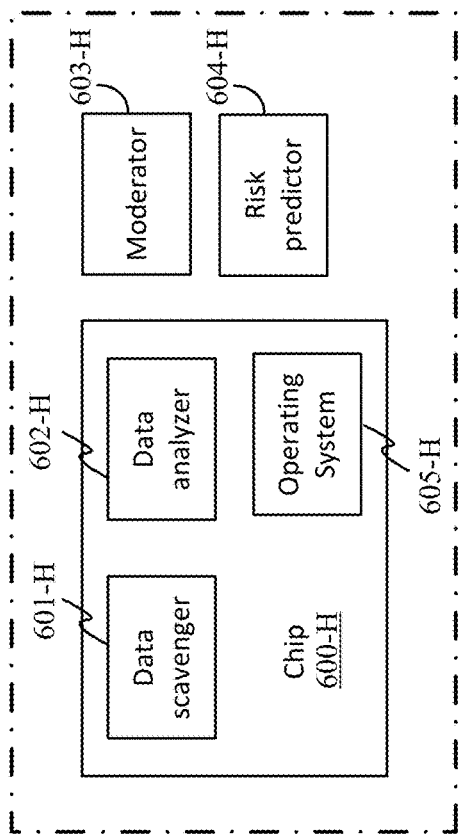
Figure 6H
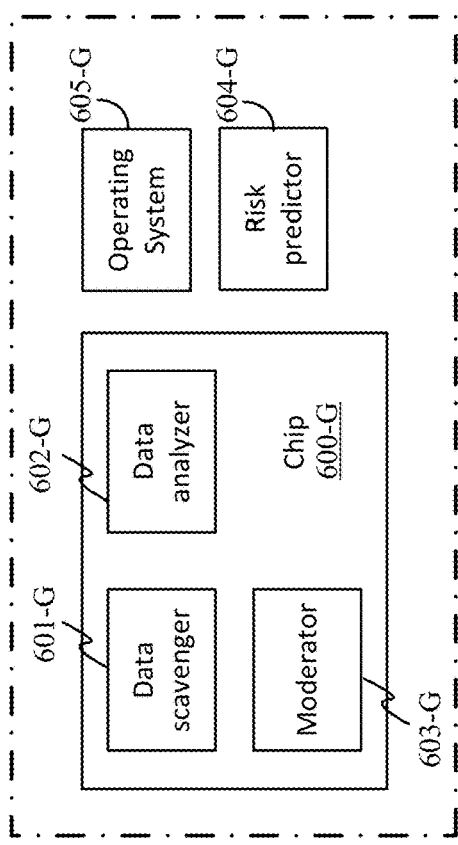
Figure 6G

MODERATOR SYSTEM FOR A SECURITY ANALYTICS FRAMEWORK

BACKGROUND

In conventional computers and computer networks, an attack refers to various attempts to achieve unauthorized access to technological resources. An attacker may attempt to access data, functions, or other restricted areas of a susceptible computing system without authorization. Computing systems generally include one or more integrated circuits (ICs). ICs are manufactured on chips and may be in the form of a system on a chip (SoC) or in discrete components coupled together in packaging such as 3D ICs or on a board. Attacks may be software based, physical (e.g., probing of IC components), or side-channels (e.g., capturing information from power consumption, timing information, and electromagnetic leakages).

BRIEF SUMMARY

A security analytics framework is provided that can combine monitoring and intelligence to help defeat attackers seeking to extract information from a chip or system. Analytics processing circuitry can implement at least part of a security analytics framework that includes a data scavenger, a data analyzer, a moderator, and a risk predictor. A moderator system is described that provides moderation—intelligence and feedback—to a security analytics framework.

A method to provide moderation to a security analytics framework can provide protection against attacks utilizing an iteration-based strategy. The method can include sending a first model to a risk predictor for a system, wherein the first model includes context information for a particular application of the system; receiving operational data from the system; performing training on one or more stored models including the first model using the received operational data to generate at least a second model; sending the second model to at least the risk predictor; determining whether to make an adjustment to a security configuration of the system based on at least the received operational data; determining a particular security configuration for the system based on at least the received operational data; and sending the particular security configuration to at least one component of the system.

A moderator system can manage the method to provide moderation to a security analytics framework. The moderator system can include a moderator controller, an interface for communicating with components of the security analytics framework; a data resource containing one or more models of particular operations of a system, and a training module that trains the one or more models based on received data from at least the system. The moderator system can also optionally include one or more of an encoder and decoder for sensitive data, an update model API for receiving models to update a particular component of the system, and a data API for communicating observational data to a third party.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 6A-6J illustrate example configurations of components of an analytics processing system.

DETAILED DESCRIPTION

A security analytics framework is provided that can combine monitoring and intelligence to help defeat attackers seeking to extract information from a chip or system. Analytics processing circuitry can implement at least part of a security analytics framework that includes a data scavenger, a data analyzer, a moderator, and a risk predictor. A moderator system is described that provides moderation—intelligence and feedback—to a security analytics framework.

In a specific implementation, the analytics processing circuitry can receive operation monitoring parameters relating to an integrated circuit (IC) from one or more data sources; evaluate these parameters against a behavioral model, which characterizes the "normal" operation of the IC; determine a threat probability based on divergence from the model; and, if the threat probability exceeds a threshold level, emit a threat response signal. The analytics processing circuitry can operate independent of the IC's functional circuitry.

Components of the analytics processing circuitry can be embodied by a microcontroller, an application processor, a neural network accelerator, a field programmable gate array (FPGA), or some custom design as constrained by its application domain (e.g., inside an energy constrained, low cost IoT device, or a high-end infrastructure SoC including those with at least one secure domain for sensitive information or cryptographic functions). In some cases, the analytics processing circuitry can be or include "virtual circuitry," for instance, in the form of a secure network link to a trusted agent handling the processing elsewhere (e.g., a cloud instance).

Figure 1:
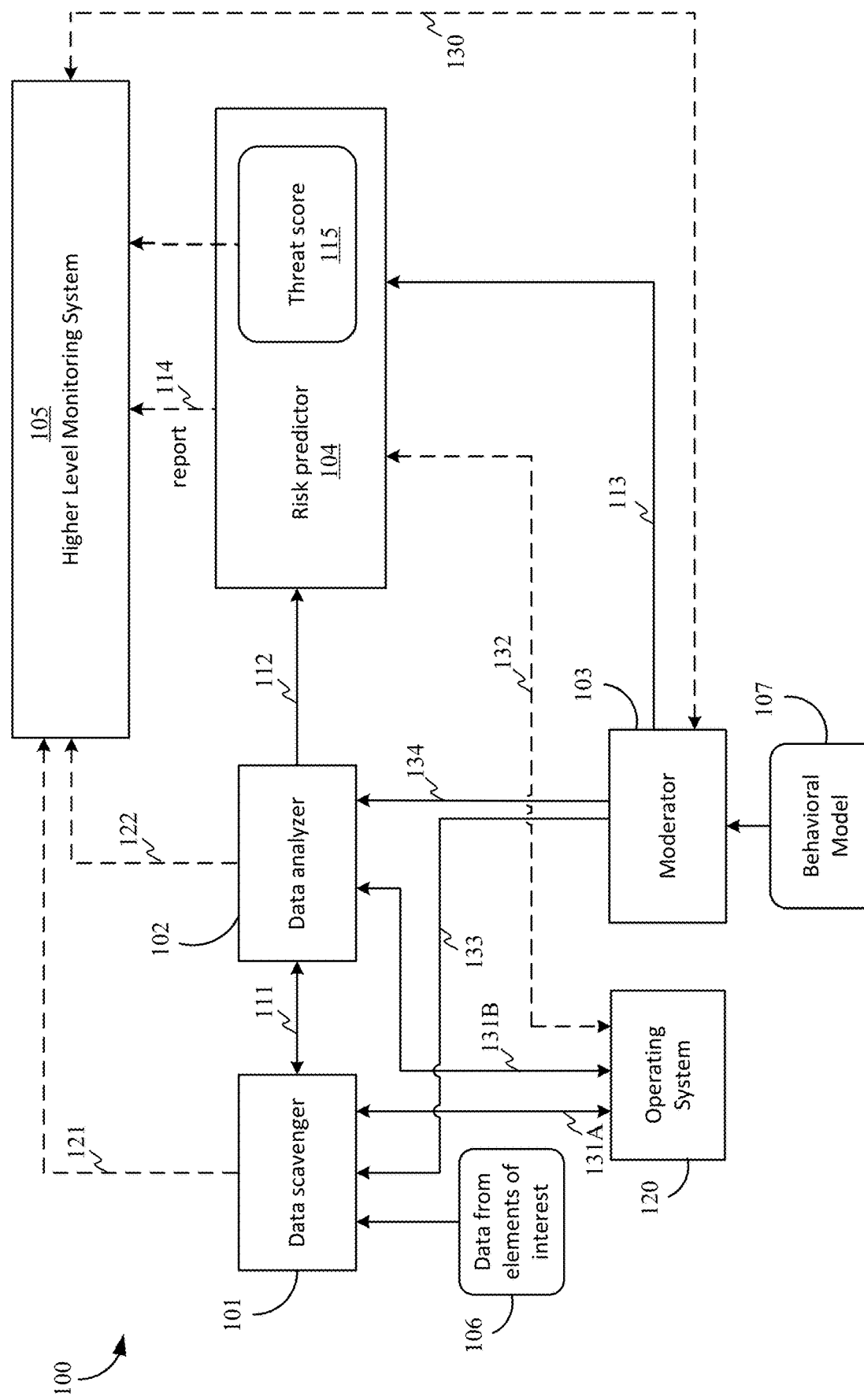
FIG. 1 illustrates an operating environment of an analytics processing system.

FIG. 1 illustrates an operating environment of an analytics processing system. Referring to FIG. 1, an operating environment 100 of an analytics processing system can include a data scavenger 101, a data analyzer 102, a moderator 103, a risk predictor 104, and a higher level monitoring system 105.

The data scavenger 101 includes a collection fabric that can collect data 106 from elements of interest in a chip and may be spread across a system on a chip or originate from a specific circuit. The data scavenger circuitry may include or communicate with counters, sensors (e.g., comparators, current detectors, voltage detectors, etc.) and storage to support collection of data including from data/address buses, command flow, and resources. In some cases, the data scavenger 101 can include sensors to detect electromagnetic emissions. In some implementations, the data scavenger circuitry includes selection circuitry to enable selection of which elements to sense, as described in more detail with respect to FIG. 2.

The data analyzer 102 communicates 111 with the data scavenger 101 and analyzes the data 106 collected from the data scavenger 101. The data analyzer 102 can include circuitry and/or processors that can be used to identify patterns in the collected data, for example, by comparing the data to predefined metrics such as core metrics, security metrics, structural metrics, probability-based metrics, unstructured/irregular metrics, and time-/frequency-based metrics. The data analyzer 102 can provide the outcome of the data analysis to the risk predictor 104.

The moderator 103 inserts intelligence into the framework and can include one or more processors and storage to support artificial intelligence, machine learning and/or deep learning processes. In some cases, the moderator 103 can generate and manage profiles (e.g., a behavioral model 107). The moderator 103 provides 113 use-case specific information of the behavioral model 107 to the risk predictor 104, which enables the use-case specific information to contextualize the data analysis provided 112 by the data analyzer 102 to the risk predictor 104.

The use-case specific information can be a usage profile/model for systems and applications such as, but not limited to, payments, content protection, an integrated Services Identity Module (iSIM)—where a chip with a form factor such as MFF2, 2FF, 3FF or 4FF is integrated with a processor core and an encrypted embedded universal integrated circuit card (eUICC) into a cellular module or SoC.

As explained above, the moderator 103 generates and/or manages a behavioral model 107 for an IC and its application. An initial model used for a particular IC and application may be deployed at manufacturing time or in the field. The model can then be updated by remotely distributed updates and/or by learning the expected application behavior over time. A behavioral model can include aspects of whitelisting, blacklisting, context interpretation, a state machine (e.g., to enforce a specific order of operations, such as requiring secure boot prior to unlocking certain features), threat context, usage context, etc. As an example implementation of a behavioral model 107, the behavioral model may compare the current clock skew against normal operating thresholds to identify fault injection attacks, or identify a large number of repeated writes to the same memory address as a potential RowHammer attack.

The risk predictor 104 includes components that are used to generate a probabilistic report 114 of risky behavior synthesized based on information obtained from the data analyzer 102 and the moderator 103. The risk predictor 104 can generate a risk assessment regarding whether the operational data is indicative of normal behavior or abnormal behavior based on the identified patterns in the operational data (e.g., as collected by the data scavenger 101 and analyzed by the data analyzer 102) and a behavioral model 107 for the IC (e.g., as provided by the moderator). A threat score 115 may be generated by the risk predictor 104 to indicate the probability of an ongoing attack and can involve assigning weights to various features identified by the risk predictor 104. The report 114 and threat score 115 may be provided to the higher level monitoring system 105. The risk predictor 104 can further provide an output according to a response policy, which can be fed back to adjust the state of the underlying chip or system directly or, for example, via the moderator 103. Thus, a threat response can be performed based on the risk assessment generated by the risk predictor 104.

The higher level monitoring system 105 receives information from multiple sources such as neighboring ICs or networked devices (e.g., as various reports 114 from different chips/systems) and can detect trends over the different chips/systems. In some cases, the operating system software 120 can be considered part of the higher level monitoring system 105. In some cases, information may be communicated to the higher level monitoring system 105 via the operating system software 120. The higher level monitoring system 105 may communicate 130 with the moderator 103 to provide feedback and adjustments for the behavior models (e.g., 107). In some cases, data from the data scavenger 101 can be provided 121 directly to the higher level monitoring system 105. In some cases, information from the data analyzer 102 can be provided 122 directly to the higher level monitoring system 105.

Thus, a deliverable to the higher level system 105 can include any one or more of the raw data (e.g., data 106) collected by the scavenger 101, output of the analyzer 102, a risk report 114, or the threat score 115. In addition, behavioral models 107 from the moderator 103 may be included as part of deliverables. In some cases, these various deliverables can be made available by application programming interfaces. In addition, security features can be applied for secure communications between systems.

Operating system software 120 can provide information (e.g., a status signal) of activities and actions taken by applications (including status of the device) to the data analyzer 102, either via a channel 131A to the data scavenger 101 or via a direct channel 131B to the data analyzer 102. These channels of communication 131A, 131B can inform the data analyzer 102 of current activities and also what the operating system expects to be happening. In some cases, operating system software 120 can have a channel 132 of communication with the risk predictor 104 such that applications running on the operating system software can utilize the risk report 114 and/or threat score 115.

As an example use case, malware on a mobile phone may cause the operating system to indicate that the camera is not turned on; and the software status of the camera may be that the camera and microphone are not turned on. However, the data scavenger 101 can collect information on the power signature and the data analyzer 102 can identify that the power signature is indicative of the camera and microphone being turned on. The data analyzer 102 may output information on the issue to the risk predictor 104 when the input of the operating system software 120 of "the camera is off" conflicts with the determination by the data analyzer that the power signature is indicative of the camera being on.

As mentioned above, although not illustrated in FIG. 1, the operating system software 120 (and the host computing system on which it runs) may be considered to be part of the higher level system 105 and/or be the conduit through which communications can be transmitted to the higher level system 105.

The operating system software 120 and/or the higher level monitoring system 105 can pass down to the analytics processing system information on new threats that may be identified and, either directly or via the moderator 103, make changes to what is being collected and analyzed and/or what countermeasures may be implemented. In this manner, a threat may be identified on one device and countermeasures put in place at other devices through communications to those devices (e.g., via the higher level monitoring system 105) to avoid that threat.

In various implementations, the moderator 103 can be used to adjust aspects of the framework including what data 106 is collected from the data scavenger 101 (via communication 133) and what patterns or predefined metrics are applied at the data analyzer 102 (via communication 134).

The data scavenger 101, data analyzer 102, moderator 103, risk predictor 104, a higher level monitoring system 105 may variously be on the same or a different chip, on the same or a different board, as part of the same or a different system, depending on the implementation. FIGS. 6A-6J illustrate some example configurations. In some cases, at least some of these components are on a system with an operating system 120. However, the circuitry of the data scavenger 101, data analyzer 102, moderator 103, and risk predictor 104 do not need to cooperate with the operating system 120; rather the circuitry can operate in their own secure domain (together or separately). Thus, if the operating system 120 has been compromised, the circuitry can trigger a factory reset and not be controlled by a compromised system.

Figure 2:
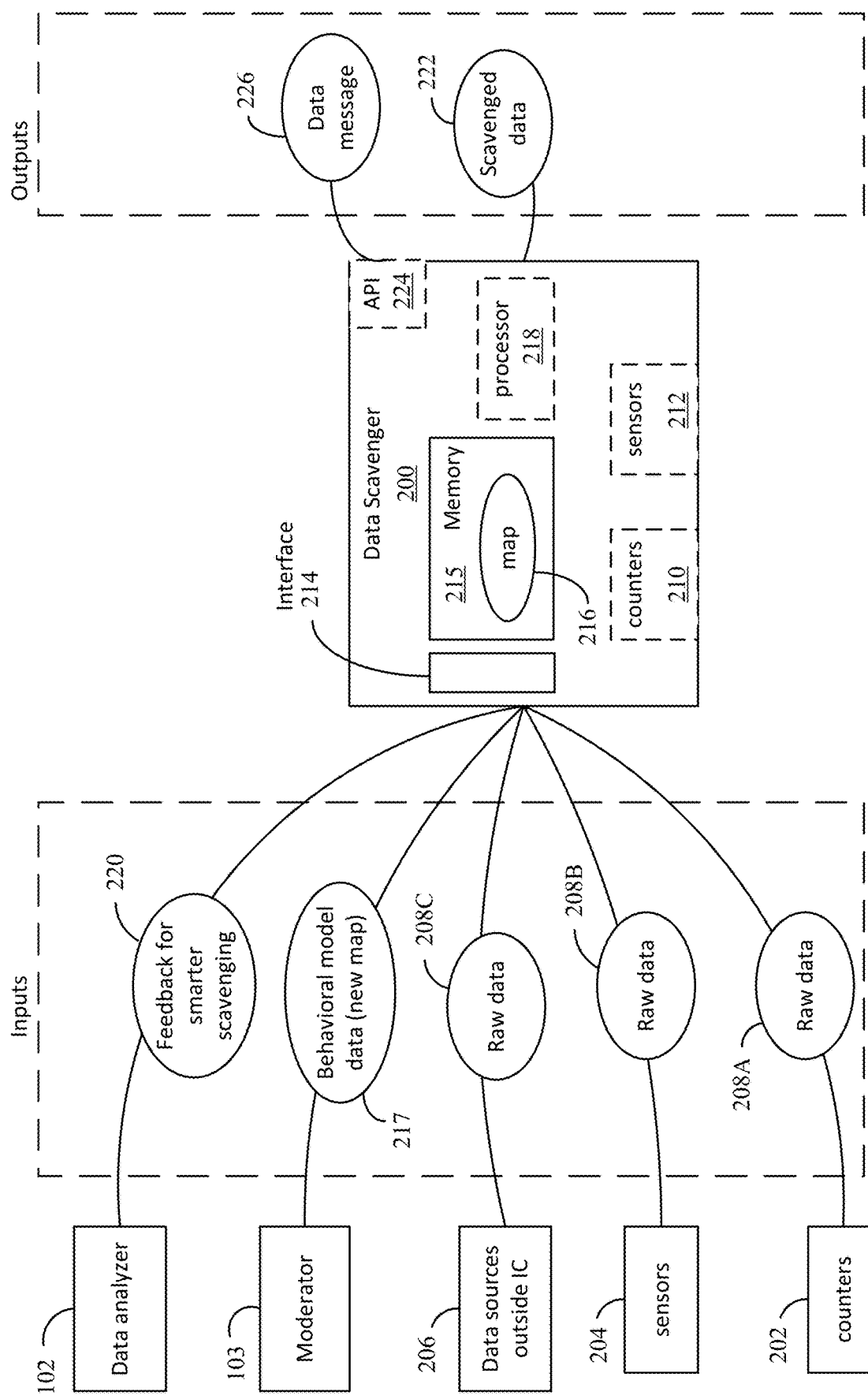
FIG. 2 illustrates a representational diagram of a data scavenger and its inputs and output.

FIG. 2 illustrates a representational diagram of a data scavenger and its inputs and outputs. As mentioned above with respect to the data scavenger 101 of FIG. 1, a data scavenger 200 can scavenge/collect data from at least one element of interest from sources such as counters 202, sensors 204, and outside the IC 206. These sources are resources of raw data 208A, 208B, 208C.

Counters 202 can include performance counters such as for cache hit/miss, store buffer fill level, branch miss prediction, cache flush signal, current power state, and interrupts per second, as examples. Counters 202 can further include system counters such as for memory, networking, power management, and other components. Counters 202 can also include debug/software visible performance counters. The analytics processing circuitry, and in particular data scavenger 200, can further include its own dedicated counters 210.

Sensors 204 can include sensors for the power supply voltage level (direct readout or threshold level indicators such as over/under power), current clock skew, on-chip temperature, physical stress level (e.g., bend or pressure), noise level (for on-chip antennas having too little noise may indicate an attack because the device may be shielded to reduce interference during an EM analysis attack). In some cases, sensors 204 can include sensors detecting physical location and/or velocity of the chip (e.g., GPS, accelerometer, magnetometer, gyroscope). The analytics processing circuitry, and in particular data scavenger 200, can further include its own dedicated sensors 212.

Sources outside the IC 206 can include neighboring ICs, such as nearby nodes or IoT devices and from trusted edge devices or servers (e.g., warnings of ongoing DDoS attacks). Sources outside the IC 206 can also include higher level systems and ICs that are off-chip but on the same board. The lack of signals in cases where signals are expected can also be captured. For example, a lack of outside data may be considered suspicious in cases such as heartbeat packages (the packet of data sent from one entity to another entity on a regular basis to confirm the liveliness of a communication channel) being intercepted or a location beacon being blocked.

The data scavenger 200 can have selection circuitry including an optional interface 214 and a memory device 215 such as a register (e.g., a flip flop or latch), a read only memory (ROM), or a random access memory (RAM) such as MRAM (magnetoelectric RAM) or CeRAM (Correlated Electron RAM), that stores a memory map 216 indicating the resources to collect information from. The interface 214 can include the circuitry supporting communications off-chip or to other parts of a system on a chip. The interface 214 may include switches or more complicated circuitry. The memory map 216 can be considered a configuration signal. In some cases, this memory map 216 is used to turn on or gain access to certain resources. For example, the memory map 216 may be used to indicate which switches to select to turn on a resource. Of course, some resources may be turned on directly by the value (from the memory map 216) of the register/memory device. In some cases, the memory map 216 can be initiated by ROM code (e.g., the code executed by a booting core).

In some cases, the memory map 216 can be updated, for example by the moderator 103 based on a new behavioral model (e.g., providing a new map 217). This new map 217, provided by the moderator 103, indicates the configuration signal to the selection circuitry. In some cases, the resources identified by the memory map 216 turn on or have data that is collected in response to a particular trigger. For example, if there are ten resources that could provide data, the memory map 216 may turn on/collect data from eight of the ten resources when specified operation codes (op-codes) are about to be executed or during a sensitive operation (e.g., in response to an indication that a cryptographic operation is to be performed or other sensitive operations such as accessing sensitive data or address locations that do not involve cryptographic operations or accessing on-board resources such as analog to digital converters (ADCs)). In some cases, the data scavenger 200 can further include a processor 218. The processor 218 may be dedicated to managing the memory map configurations. In some implementations that includes the processor 218, the processor 218 can be in a secure part of the chip. In some cases, the processor 218 can be used to implement a neural network to facilitate the configurations for collecting the data from the sources. In some cases, feedback information 220 from the data analyzer 102 can be used by the data scavenger 200 to adjust what data is collected or provided to the data analyzer 102. For instance, by adjusting the collection frequency or source selection.

The data collected by the data scavenger 200 can be output as scavenged data 222, which may be provided to the data analyzer 102. In some cases, the data scavenger can include an application programming interface (API) 224, which can be used to provide data (e.g., a data message 226) to requesting components.

Figure 3:
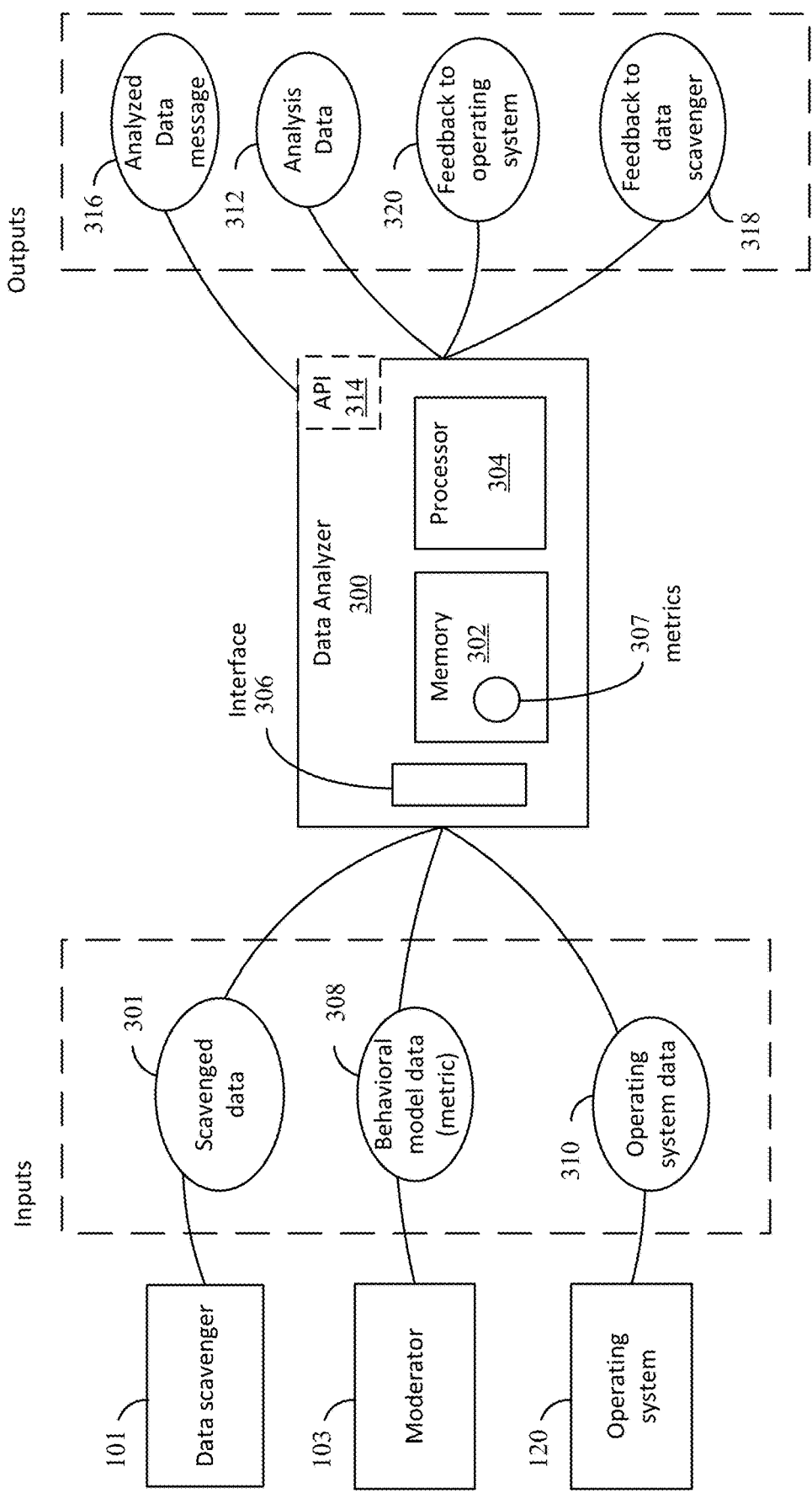
FIG. 3 illustrates a representational diagram of a data analyzer and its inputs and outputs.

FIG. 3 illustrates a representational diagram of a data analyzer and its inputs and outputs. As mentioned above with respect to data analyzer 102 of FIG. 1, a data analyzer 300 communicates with the data scavenger 101 and analyzes the data (e.g., the scavenged data 301) collected from the data scavenger 101.

The data analyzer 300 can include a memory device 302, a processor 304, and an interface 306.

The memory device 302 can include volatile and/or non-volatile memory and may be located in a secure environment on a chip. The memory device 302 can store software that when executed by the processor 304, directs the data analyzer 300 to identify patterns in the data from the data scavenger (e.g., the scavenged data 301) over a time frame or for a snapshot of time based on a predefined metric. The memory device 302 can further store the details of predefined metrics 307 (which can include the predefined metric used to identify the patterns in the data) and receive updates to the predefined metric (e.g., as an updated predefined metric from the moderator 103 as part of the behavioral model data 308) which can be stored in the memory device 302. As previously mentioned, the predefined metrics can include core metrics, structural metrics, probability-based metrics, time-/frequency-based metrics, unstructured/irregular metrics, or a combination thereof.

As an illustrative example of a predefined metric, a baseline model or a rule based metric may indicate that a chip with an AES core in a mobile device should have less than a thousand encryptions occurring within one second. For another chip, such as in a set top box, the metric would be different and this rule would not apply since every frame in a stream may be decrypted (and so many encryptions would be expected to be occurring).

Just as the resources identified by the memory map 216 of the data scavenger 200 (as described with respect to FIG. 2) can turn on or have data that is collected in response to a particular trigger, the data analyzer 300 can receive and process the scavenged data 301 in response to a particular trigger. The particular trigger for the data analyzer 300 may be an event of interest and may indicate whether a snapshot or time interval of data from the data scavenger 101 should be captured and processed. In some cases, the particular trigger is the same trigger for both components. In some cases, the trigger is defined by the predefined metric. For example, as mentioned above, the predefined metric can include unstructured/irregular metrics such as a single event or a sequence of events or even a cluster of events that do not need to be periodic in nature.

The processor 304 can be a dedicated hardware component on a system on a chip and, along with the memory device 302 be part of a secure environment or be a processor-memory subsystem with its own logic security boundary. The processor 304 may include an accelerator (e.g., a Convolutional Neural Network or other type of Artificial Intelligence accelerator).

The interface 306 can include dedicated hardware for communicating with the data scavenger 101 (which may be implemented as described with respect to the data scavenger 200 of FIG. 2). In some cases, the data scavenger 101 can be coupled to the data analyzer 300 via the interface 306. In some cases, the interface 306 includes components for communicating with higher level systems, such as the operating system 120, which can provide operating system data 310 to the data analyzer 300.

The data generated by the data analyzer 300 can be output as analysis data 312, which may be provided to the risk predictor 104. In some cases, the data analyzer can include an application programming interface (API) 314, which can be used to provide data (e.g., analyzed data messages 316) to requesting components. In some cases, the output of the data analyzer 300 can include feedback to the data scavenger 318 and even feedback to the operating system 320.

Figure 4:
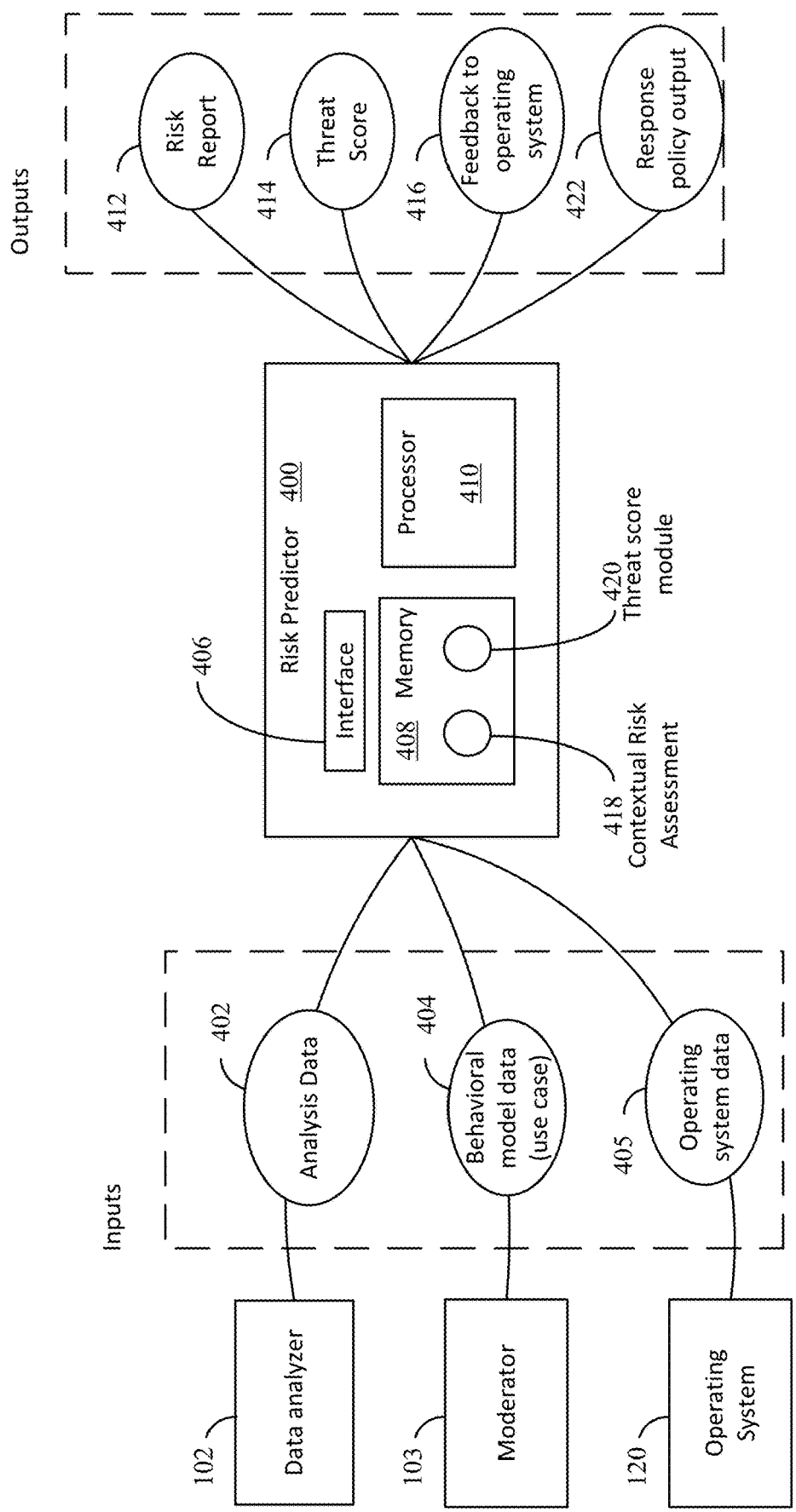
FIG. 4 illustrates a representational diagram of a risk predictor and its inputs and outputs.

FIG. 4 illustrates a representational diagram of a risk predictor and its inputs and outputs. As mentioned above with respect to the risk predictor 104 of FIG. 1, a risk predictor 400 can synthesize information 402 from a data analyzer 102 with use case specific context (e.g., the behavioral model data 404) provided from a moderator 103. The risk predictor 104 can also receive operating system data 405 from an operating system 120. The operating system data 405 can include software-based annotations for expected behaviors of circuit operations.

The risk predictor 400 can include an interface 406, memory device 408, and processor 410.

The interface 406 can include hardware for communicating with the data analyzer 102, moderator 103, and higher level systems (e.g., operating system 120, system 105 of FIG. 1). As previously described, the risk predictor 400 can provide a risk report 412, threat score 414, and other output such as feedback 416 to an operating system 120.

The risk predictor 400 includes instructions 418 for a contextual risk assessment stored in the memory 408 that when executed by the processor 410 direct the risk predictor to generate a probabilistic report (e.g., risk report 412) using the analysis data 402 and behavioral model data 404. In some cases, the instructions 418 for the contextual risk assessment can include algorithms for machine learning, deep learning/neural network. A threat score 414 may be generated by the risk predictor 400 via the threat score module 420 to indicate the probability of an ongoing attack and can involve assigning weights to various features identified by the risk predictor 400. The risk predictor 400 can further provide an output 422 according to a response policy, which can be fed back to adjust a state of the underlying chip or system directly or, for example, via the moderator 103. The response policy output 422 indicates how the underlying chip or system should respond to the identified risk. The response policy output 422 can be used to update behavioral models and countermeasures (e.g., threat responses) such as described herein. In some cases, the risk predictor 400 can build a risk report 412 on the output of the data analyzer 102 only.

Figure 5B:
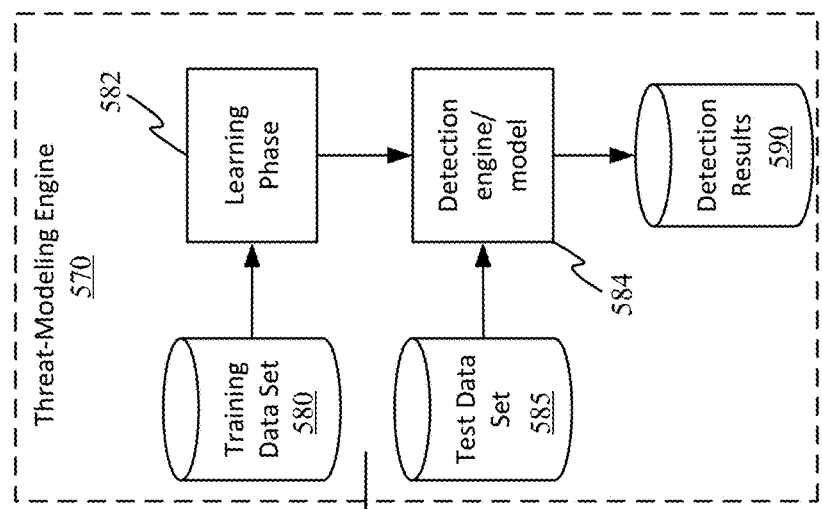
FIG. 5B illustrates an example threat-modeling engine.
Figure 5A:
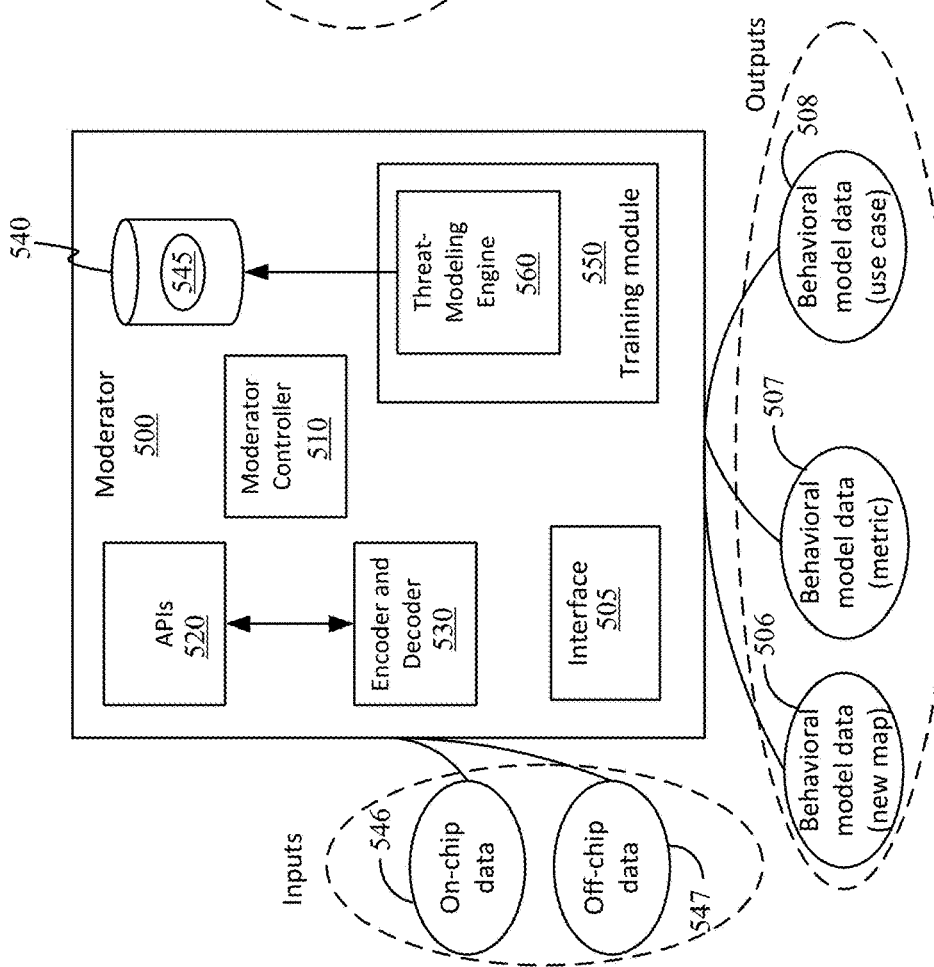
FIG. 5A illustrates a representational diagram of a moderator.

FIG. 5A illustrates a representational diagram of a moderator. As described with respect to moderator 103, moderator 500 inserts intelligence into the framework, with connections to/communication with one or more of the other components of the security framework. Moderator 500 can include interfaces 505 for components of the framework in order to provide behavioral model data such as a new memory map 506 to a data scavenger, a new metric 507 to a data analyzer, and a use case-specific model 508 to a risk predictor. The interface 505 can include a communications interface enabling communication between systems on chip or off chip (or both), depending on the implementation.

Moderator 500 can include a moderator controller 510, one or more APIs 520, an encoder and decoder 530 for sensitive data, one or more storage resources 540 that can store one or more models 545 (and other data or instructions supporting artificial intelligence, machine learning and/or deep learning processes), and a training module 550 that trains the one or more models 545 based on received operational data such as scavenged data and analyzed data from at least one computing system/IC (and, for example, corresponding data scavenger and/or data analyzer). That is, the moderator 500 can gather operation monitoring data from one or more on-chip data sources (as data 546) and one or more off-chip sources (as data 547). These on-chip data sources can include performance counters, power management & monitoring circuitry, antennas, etc. The off-chip sources can include neighboring devices or the cloud and can provide additional information (e.g., a warning about currently ongoing attacks/suspicious activity). In some cases, the training module 550 includes an inference engine; in other cases, such as illustrated in FIG. 5A, the training module 550 includes a threat-modeling engine 560.

The moderator controller 510 can control other functions within the moderator 500. The moderator controller 510 can include, for instance, one or more processors and local storage of executable code ("instructions"). In some cases, the moderator controller 510 can implement or include a neural network.

The one or more APIs 520 can serve as a point of communication between the moderator 500 and one or more third parties. That is, in addition to interfaces supporting communication with one or more of a data scavenger, data analyzer, risk predictor, operating system/other higher level system, the moderator 500 can provide the one or more APIs 520 to support receipt of models and data from third parties and requests for information by third parties. The moderator 500 may provide a specialized portal accessible through an application or a more generalized gateway that can be accessed through a web portal. The APIs 520 can include an update model API, which allows the moderator to receive models from a third party to update a particular component of the system. The one or more APIs 520 can also include a data API, which allows the moderator 500 to communicate the received data to a third party. The one or more APIs 520 can also be coupled with the encoder and decoder 530 to decode any received inputs or encode any outputs to be sent to one or more third parties.

The encoder and decoder 530 can include circuitry or programming to encode or decode messages according to various methodologies. The encoder and decoder 530 can be used to facilitate secure communication between separate systems.

The one or more storage resources 540 can include any suitable hardware storage devices.

The one or more models 545 can be generated and/or managed by the moderator 500. The one or more models 545 can include profiles for operational behavior during different types of attacks and normal operation. The models can be output from the training module 550 and accessed by the moderator controller 510 to send to the security analytics framework (e.g., to provide use-case specific information to a risk predictor 104 or to update or adjust operations of a data scavenger 101 or data analyzer 102) or sent out to a third party. The training module 550 can include a threat-modeling engine 560 to perform analyses on sets of data to determine more effective detection methodologies. In some cases, the training module 550 can implement or include a neural network. An example of a learning process of a threat-modeling engine can be seen in FIG. 5B. The training module 550 can be configured to run periodically, continuously, or require a trigger from the moderator controller 510.

The moderator 500 can evaluate the received operational data (e.g., on-chip data 546 or off-chip data 547) against a behavioral model to determine a threat probability. The model (e.g., of one or more behavioral models 545) may be generated locally (on the device being monitored) or remotely (on an edge device or a cloud instance) and managed by the moderator 500. Based on the threat probability identified by a risk predictor (e.g., whether the threat probability exceeds certain threshold levels), threat response signals can be triggered. The threat responses may be handled by the device being monitored itself or by the analytics processing circuitry (e.g., one or more of the data scavenger, data analyzer, risk predictor, or moderator). The responses can differ based on the type and severity of the threat.

FIG. 5B illustrates an example a threat-modeling engine. Referring to FIG. 5B, an example threat-modeling engine can receive operational data 575 from one or more chips to be used as a training data set 580 in a learning phase 582 to generate an initial model. The learning phase 582 can feed the model to the detection engine 584, which takes in a test data set 585 to generate detection results 590. The learning phase 582 can include one or more methodologies of machine learning, including deep learning or use of various neural networks. Using the detection engine 584, the outputs of the learning phase 582 can be compared against the test data set 585 to determine the accuracy of the model trained in the learning phase 582.

FIGS. 6A-6J illustrate example configurations of components of an analytics processing system. As described above with respect to FIG. 1, the components of an analytics processing system, including a data scavenger 601, data analyzer 602, moderator 603, risk predictor 604, operating system 605 (with memory and processor) may be on the same chip or different chips. Further, when components are on the same chip, some of such components may be in a secure logic region and other of such components may be in a non-secure region of the chip.

Figure 6A:
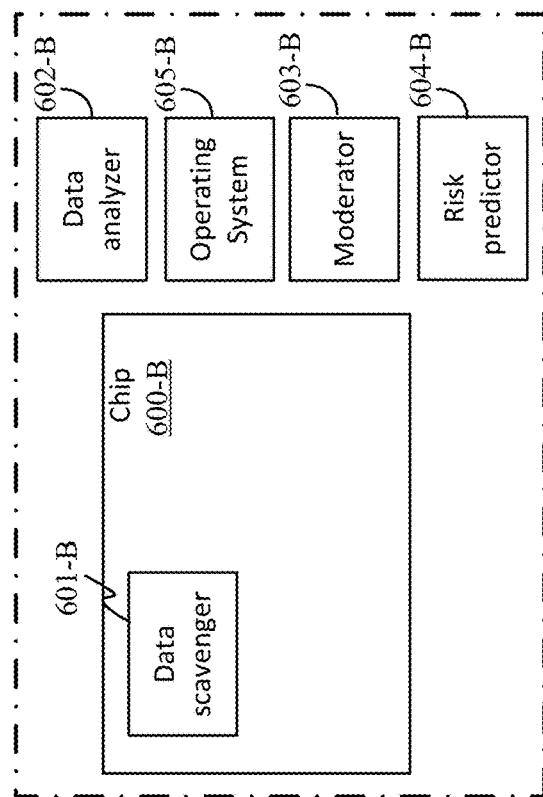

FIG. 6A illustrates a configuration where the data scavenger 601-A, data analyzer 602-A, moderator 603-A, risk predictor 604-A, and operating system 605-A are on the same chip 600-A.

Figure 6B:
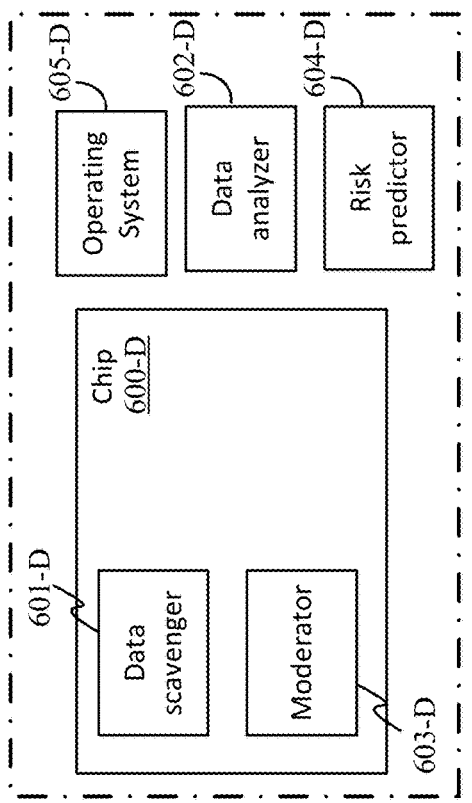

FIG. 6B illustrates a configuration where the data scavenger 601-B is on-chip 600-B; and the data analyzer 602-B, moderator 603-B, risk predictor 604-B, and operating system 605-B are not located on the chip 600-B.

Figure 6C:
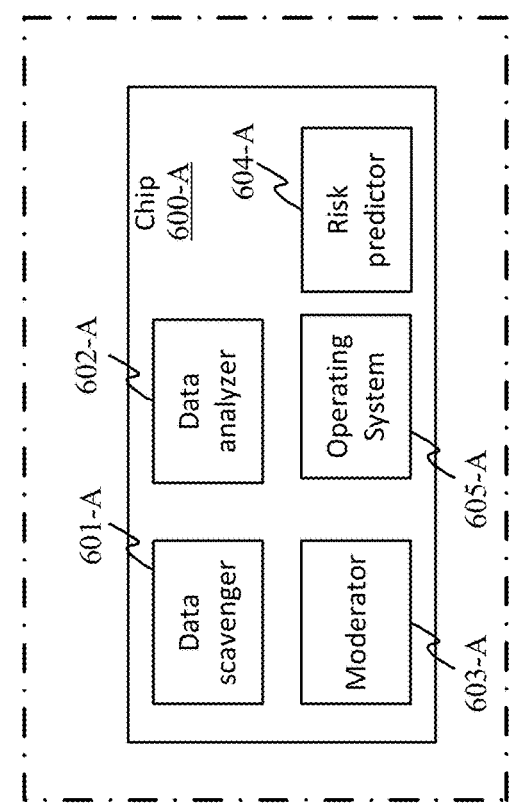

FIG. 6C illustrates a configuration where the data scavenger 601-C and operating system 605-C are on the same chip 600-C; and the data analyzer 602-C, moderator 603-C, and risk predictor 604-C are not located on the chip 600-C.

Figure 6D:
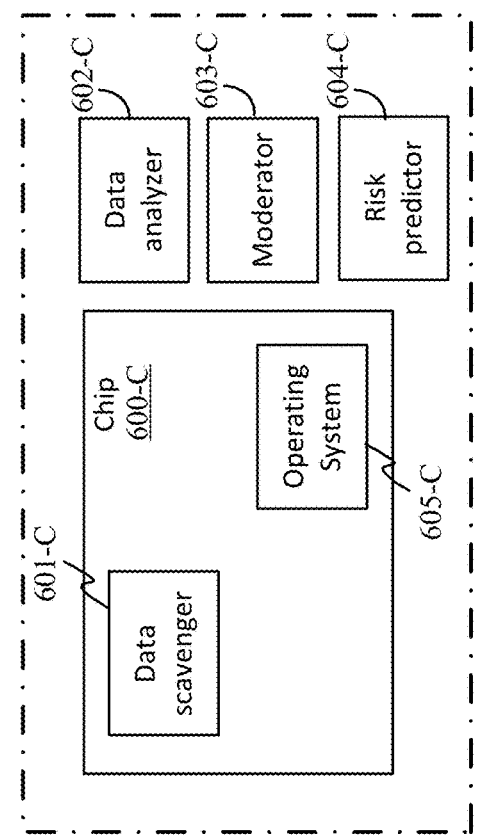

FIG. 6D illustrates a configuration where the data scavenger 601-D and moderator 603-D are on the same chip 600-D; and the data analyzer 602-D, risk predictor 604-C, and operating system 605-D are not located on the chip 600-D.

When the data analyzer 602 is off chip, such as shown in FIGS. 6B, 6C, and 6D, the chip 600 can include an interface to an off chip trusted processor providing the analyzer functions. For example, snapshots of information from the scavenger 601 can be captured and communicated off-chip to the analyzer 602. Whether on chip or off chip, the data analyzer 602 (and other components) can include certain security and encryption measures as discussed in more detail with respect to FIG. 12. In some cases where the data analyzer 602 is off chip, at least some data analysis may be conducted on the chip.

FIG. 6E illustrates a configuration where the data scavenger 601-E and data analyzer 602-E are on the same chip 600-E; and the moderator 603-E, risk predictor 604-E, and operating system 605-E are not located on the chip 600-E.

FIG. 6F illustrates a configuration where the data scavenger 601-F, data analyzer 602-F, and risk predictor 604-F are on the same chip 600-F; and the moderator 603-F and operating system 605-E are not located on the chip 600-F.

FIG. 6G illustrates a configuration where the data scavenger 601-G, data analyzer 602-G, and moderator 603-G are on the same chip 600-G; and the risk predictor 604-G and operating system 605-G are not located on the chip 600-F.

FIG. 6H illustrates a configuration where the data scavenger 601-H, data analyzer 602-H, and operating system 605-H are on the same chip 600-H; and the moderator 603-H and risk predictor 604-H are not located on the chip 600-F.

Figure 6I:
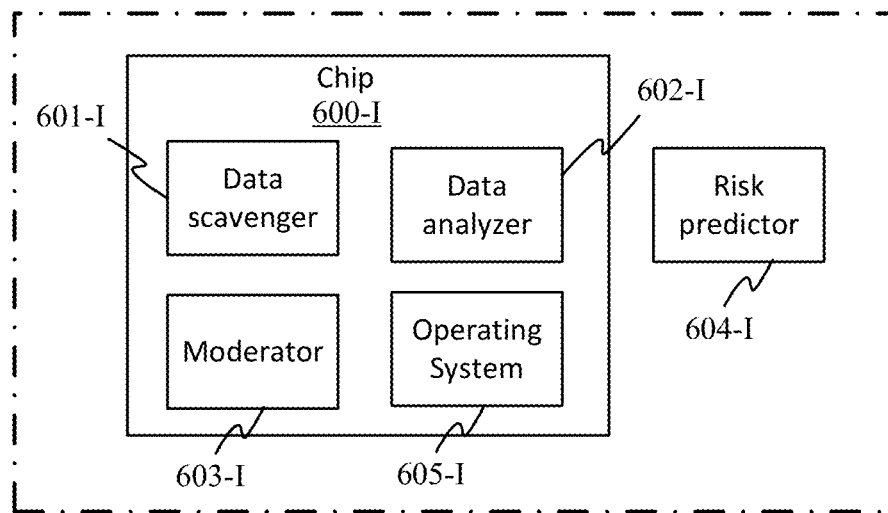

FIG. 6I illustrates a configuration where the data scavenger 601-I, data analyzer 602-I, moderator 603-I, and operating system 605-I are on the same chip 600-I; and the risk predictor 604-I is not located on the chip 600-I.

Figure 6J:
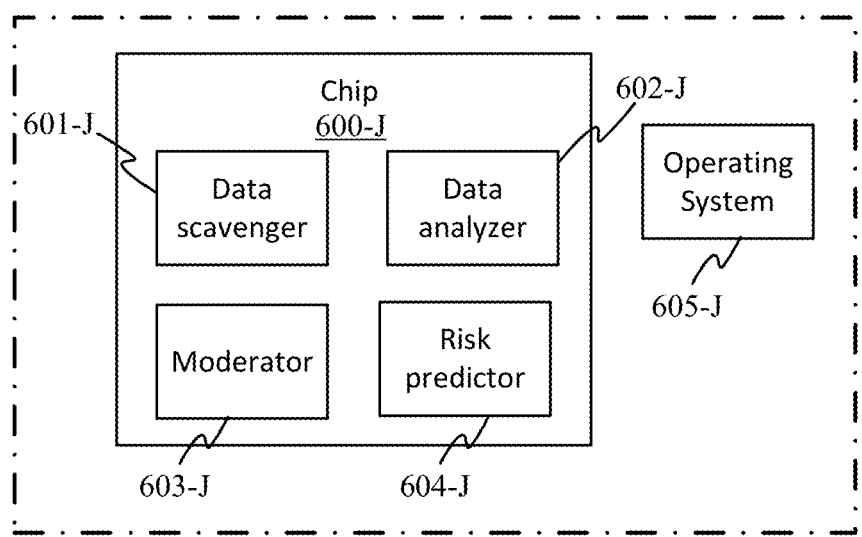

FIG. 6J illustrates a configuration where the data scavenger 601-J, data analyzer 602-J, moderator 603-J, and risk predictor 604-J are on the same chip 600-J; and the operating system 605-J is not located on the chip 600-J.

Where both the data scavenger and the data analyzer are on the same chip, such as in FIGS. 6A and 6E-6J, the data analyzer 602 itself can be intermingled/distributed with the data scavenger 601 on the chip. As an example, the data scavenger 601 may have one element of interest resulting in collecting information related to operation codes (op-codes) being executed on the chip. A dedicated part of the data analyzer 602 may detect that two op-codes identified by the data scavenger 601 were repeating in succession and that this pattern is not normal. Such an analysis can be very local/near the source to the capturing of the information by the data scavenger and result in an action such as collecting more data, collecting less data, or change the type of scavenging being performed. A dedicated part of the data analyzer 602 may be provided near the source for each element of interest instead of at a centralized analyzer; or a combination of localized and centralized analysis may be implemented. Having data analyzer components near a data scavenger can reduce the underlying bandwidth requirements.

Figure 7A:
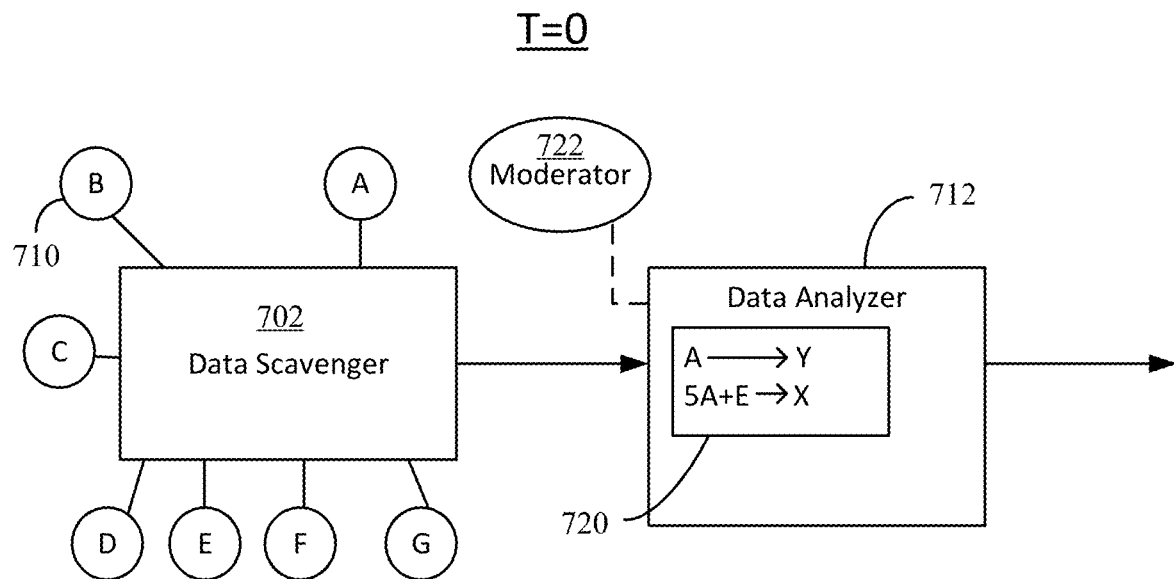
FIGS. 7A and 7B illustrate example scenarios for analytics processing circuitry.
Figure 7A:
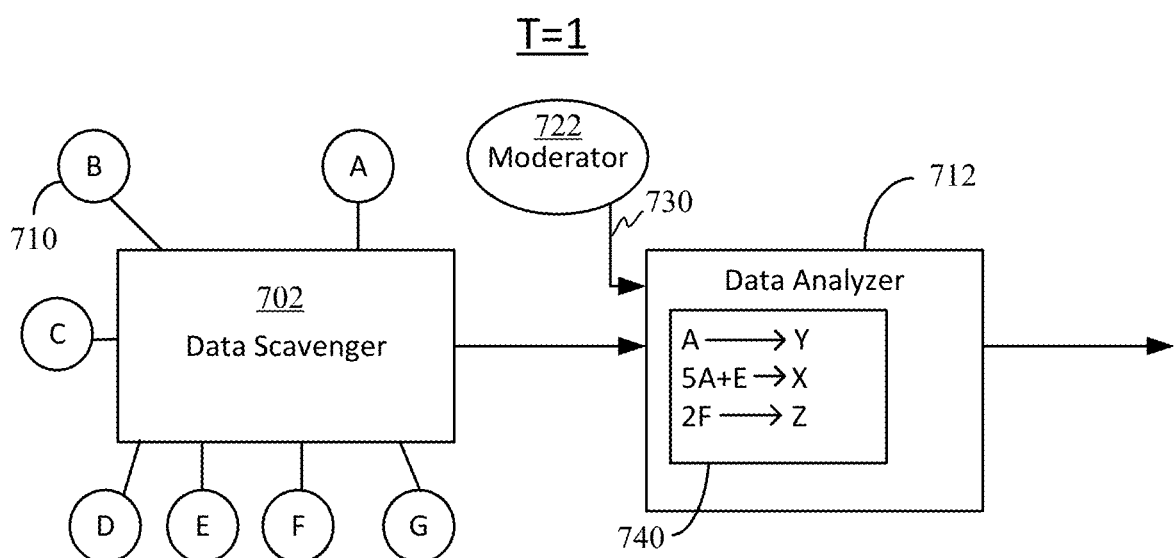
Figure 7B:
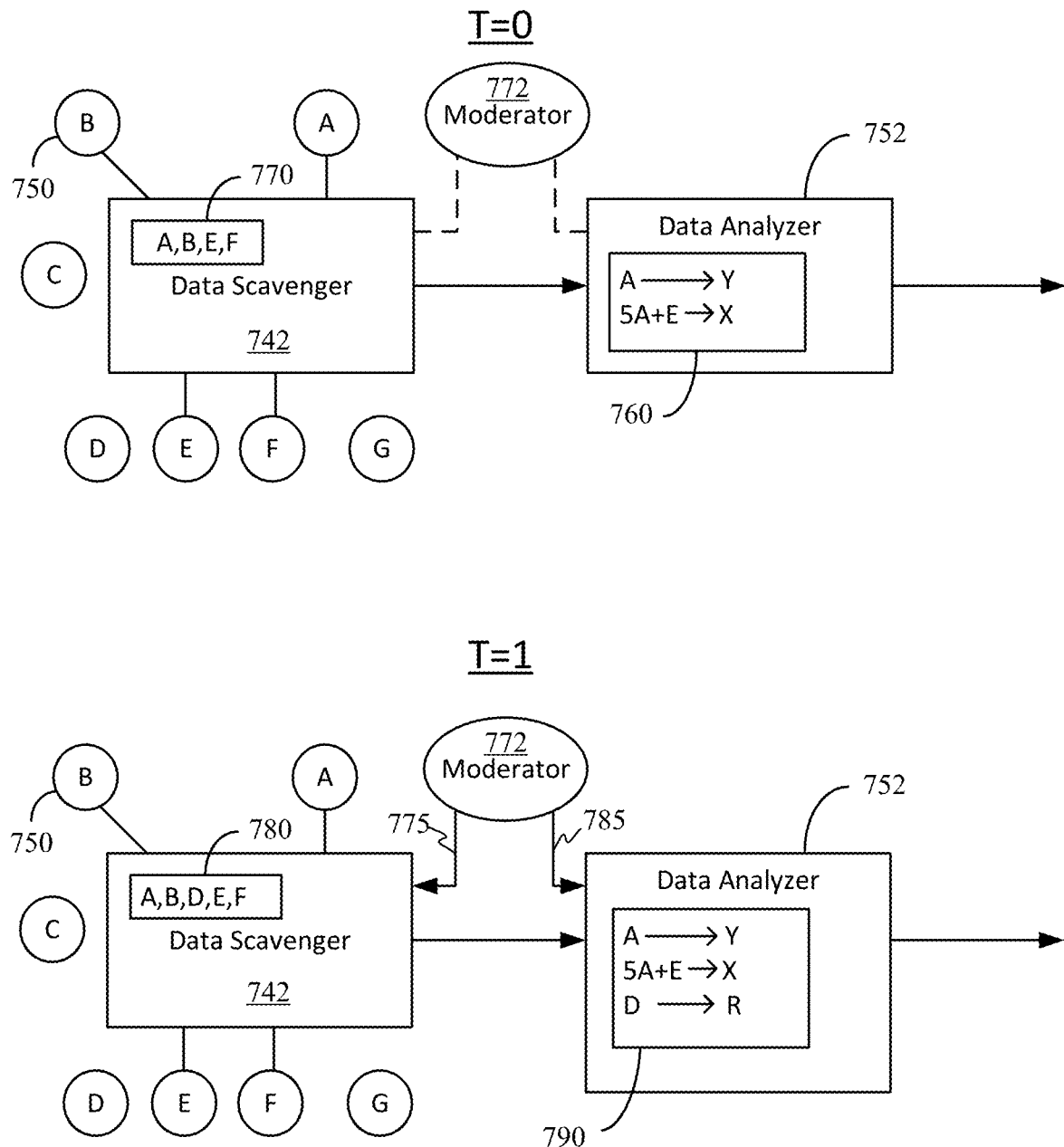

FIGS. 7A and 7B illustrate example scenarios for analytics processing circuitry. In the scenario illustrated in FIG. 7A, an analytics processing circuitry includes a data scavenger 702 configured to collect data from at least one element of interest 710 from A, B, C, D, E, F, and G elements of interest 710, and a data analyzer 712 with a predefined metric represented as the first policy 720.

Here, the data scavenger 702 can collect information from A, B, C, D, E, F, and G identified elements of interest 710. It may be the case that the data scavenger 702 is hard wired to each of the elements and/or can select between them based on a configuration signal such as a memory map 216 as described with respect to FIG. 2.

As illustrated, during a time T=0, the data analyzer 712 has a first policy 720 indicating that for each occurrence of A, do Y; and if there have been five occurrences of A and an occurrence of E, do X. In this manner, the data analyzer 712 can identify patterns in the data received from the data scavenger 702 using the predefined metric of the first policy 720.

In the illustrated scenario, the data analyzer 712 is configured to communicate with a moderator 722. At a later time T=1, the data analyzer 712 can receive (730) an update to the predefined metric, resulting in a second policy 740. The update may change an existing metric or add a new metric to the policy. Here, the second policy 740 includes a new metric that if there have been two occurrences of F, then do Z.

The responses Y, X, and Z may be particular countermeasures, feedback information to the data scavenger 702, or particular information to another component (e.g., to a risk predictor, operating system or other higher level system, or the moderator 722), as examples.

In the scenario illustrated in FIG. 7B, an analytics processing circuitry includes a data scavenger 742 configured to collect data from at least one element of interest 750 from A, B, C, D, E, F, and G elements of interest 750, and a data analyzer 752 with a predefined metric represented as the first policy 760.

Here, the data scavenger 742 includes selection circuitry to selectively collect (e.g., independent selection of) information from A, B, C, D, E, F, and G identified elements of interest 750 according to a first configuration 770.

As illustrated, during a time T=0, the data scavenger 742 has a first configuration 770 indicating that data is to be collected from A, B, E, and F identified elements of interest 750 and the data analyzer 752 has a first policy 760 indicating that for each occurrence of A, do Y; and if there have been five occurrences of A and an occurrence of E, do X. In this manner, the data analyzer 752 can identify patterns in the data received from the data scavenger 742 using the predefined metric of the first policy 760.

In the illustrated scenario, both the data scavenger 742 and the data analyzer 752 are configured to communicate with a moderator 772. At a later time T=1, the data scavenger 742 can receive (775) a configuration signal for a second configuration 780, indicating which data should be collected by the data scavenger 742. In this example scenario, the second configuration 780 indicates that data is to be collected from A, B, D, E, and F identified elements of interest 750.

At the same time T=1 or at a different time (before or after the data scavenger 742 is updated), the data analyzer 752 can independently receive (785) an update to the predefined metric, resulting in a second policy 790. As with the scenario illustrated in FIG. 7B, the update may change an existing metric or add a new metric to the policy. Here, the second policy 790 includes a new metric that for each D do R.

The responses Y, X, and R may be particular countermeasures, feedback information to the data scavenger 742, or particular information to another component (e.g., to a risk predictor, operating system or other higher level system, or the moderator 772), as examples.

As described above, analytics processing circuitry in a security analytics framework can collect status data, such as power usage or the number of routines run, from a chip; compile and analyze this data; and, in some cases, generate reports. Intelligence and feedback are added to the system by the moderator, which can receive outputs of various stages of the other components of the security analytic framework and can receive input from external sources to provide information about emerging styles of attacks in particular applications. One or more models can be curated by the moderator, and the moderator can either send the models or instructions based on the model to other components of the security analytics framework.

Most ICs with security features for sensitive information have some form of countermeasures for protecting against attacks. These countermeasures are designed and built-in to the chip. When new types of attacks are formulated, these defenses may not be sufficient. The described security analytics framework and analytics processing circuitry enable dynamic responses to emerging threats. One aspect of this capability is the inclusion of artificial intelligence (which can include machine learning, deep learning, and other approaches) and communication mechanisms that enable information, such as operational data, to be collected and analyzed with context on chip and/or across a network. Thus, when attacks change, models representing normal behavior and/or abnormal behavior can be updated and distributed, providing a resilient defense to the new attacks.

Operational data is gathered on-chip, for example in form of performance counters, power supply measurements, op-code sequences and clustering. Some of this operational data has intelligence and it is possible to extract indicators of compromise. The indicators of compromise are not necessarily related to an attack on the chip. Since the chip is participating in a system and the system is participating in a larger network, when an attack is happening at the higher system level, the information—the operational data—that can be collected from the hardware at the chip level or a few chips on the network level can hold the clues to the attack, for example malware that has been installed on a mobile phone. Even though the malware itself is running at the OS level or software level, it may be possible to identify indicators of compromise at the hardware level from operational data.

The moderator and/or risk predictor or an outside service can use advanced methods such as deep learning to cluster the behaviors (that may be extracted from the collected data) to identify potential anomalies or extract explicit behavioral anomalies. These behaviors may be different for different applications since what is an expected behavior and the context differs from application to application. For example, a mobile phone can have a different expected behavior compared to a set top box, both of which would have different expected behaviors as compared to an automotive application.

Once a risk report is generated and/or threat score is identified, the threat response can be at the chip level or the hardware level, or the threat score can be passed on to a higher level monitoring system (e.g., software or operating system level) to participate in threat detection and responses.

As explained above, through a moderator, the behavior profiles/models can be deployed on the device or a remote agent to monitor device and application activity and guide/configure on-device countermeasures. The behavior profiles/models can include local profiles and remote profiles.

Examples of countermeasures include providing weights for an on-chip machine learning model aiming to disrupt dynamic power analysis attacks by changing characteristic signatures (e.g., insertion of noise; adjusting processing patterns; entering a less efficient, but more secure mode, etc.) or adding an IP address associated with an active botnet to an internal blacklist.

Local profiles can be informed by locally gathered operation monitoring data and data provided remotely via a route of trust. The latter may include default weights for machine learning (ML) algorithms and configuration parameters for other components. For instance, a higher level system may notice a type of attack pertaining to a certain class of IoT devices—such as routers including a certain model of power supply circuitry—and provide custom parameters to those devices Remote profiles can be generated outside of the device. For instance, on edge devices or cloud instances. This moves the computational complexity off the device, which can save power, benefit from more performant hardware and/or be able to use proprietary algorithms. The threat-modeling engine 570 of FIG. 5B is an example of a system suitable for remote profile generation since the training of machine learning algorithms is highly computation intensive compared to inference engines.

Both local and remote profiles can be maintained and refined over time and, when permitted, data gathered from multiple sources can be used to increase the accuracy of machine learning models. The data can also be used to refine other parameters, such as the thresholds used to determine if a certain activity is normal or a potential threat. Through communication between the moderator (e.g., moderator 103 of FIG. 1) and higher level monitoring systems (e.g., operating system 120 and higher level monitoring system 105 of FIG. 1) certain changes can be made in the context of software updates (e.g., an original equipment manufacturer (OEM) adding a new feature that affects the device's behavior or adjusting the device's behavior to adapt to newly discovered attack types).

In an example implementation, the risk predictor 104, 400 or the data analyzer 102, 300 can determine whether conditions exceed certain a threshold and if the conditions exceed a certain threshold, indicate that a response should be initiated. The indication can be internal when response is a function carried out by the analytics processing circuitry itself. The indication can be a trigger for a particular countermeasure (or a signal to a system that determines the appropriate countermeasure. The indication can be an output to software/the higher level system, which then determines appropriate action.

The threat responses triggered by the analytics processing circuitry may vary based on the type of IC, the confidence that a specific threat was detected, and the potential severity of a threat. The analytics processing circuitry may consider multiple threshold levels per threat type to account for varying levels of confidence. The type and number of responses may also be limited by the complexity of the analytics processing circuitry (e.g., IoT/edge/infrastructure device). Responses may include discrete outputs to be interpreted by other software or hardware, messages sent to one or more agents, or counter-responses, as some examples.

The discrete outputs to be interpreted by other software or hardware can be, for example, an interrupt to a CPU or a signal to an off-chip security monitor.

The messages sent to one or more agents can be, for example, to neighboring devices, an edge device or cloud instance. These messages can take the form of a warning, a request for guidance on how to handle the threat, a trigger for certain behaviors on the recipient's end, etc.

A counter-response may be to, for example, blacklist a malicious IP address, disable connectivity; slow down an on-chip clock in response to too high clock skew or an unexpected dip in the power supply voltage; throttle performance, kill a suspicious execution thread, force a reboot; disable functional units, disable caches, issue a local challenge-response; inject jitter; erase keys, perform a factory reset, or brick the device.

As mentioned above, profiles/models can be use-case-specific profiles/models generated with use-case-specific data (e.g., based on a hardware configuration of the device and/or device application of the device). In some cases, the profiles can be classified according to device application classes. For example, profiling a house alarm may show consistent activity 99% of the time. However, in the case of a scheduled test or actual break-in, the device behavior may diverge significantly enough to be categorized as a threat. One potential response to a perceived threat is a forced reboot, which in case of a break-in would be highly undesirable. Therefore, for such devices, a forced reboot would not be an indicated response under the identified conditions or device application.

As another example, devices with secure information may be subject to differential power analysis (DPA) attacks, which are a form of side-channel attack aiming to extract cryptographic keys or other sensitive information from a target device. During a DPA attack, the power consumption of a device may be monitored during the processing of the cryptographic keys or information; and signal processing algorithms are then used to "restore" these secrets for the attacker. Electromagnetic (EM) analysis attacks operate in a similar fashion. Attackers use probes to monitor EM emission over specific parts of the chip. This newer type of attack bypasses mitigations that may have previously been put into place to counter DPA attacks. By using the described analytics processing circuitry and updatable behavior models, it is possible to provide updates to the devices in order to better protect against emerging attacks.

Figure 8A:
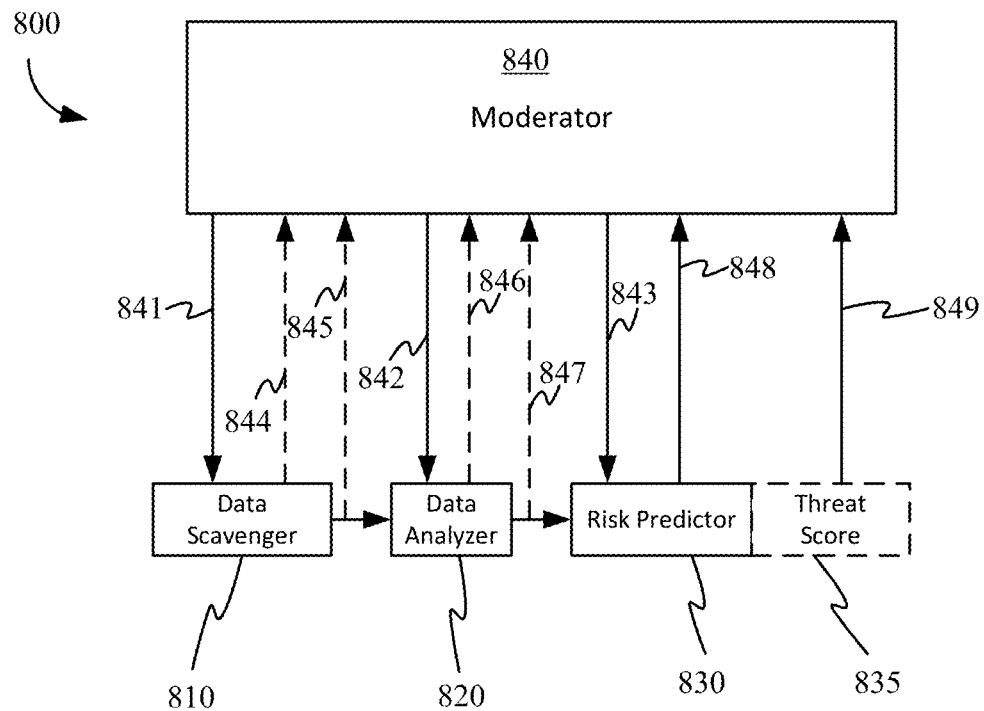
FIG. 8A illustrates communication pathways for a moderator.
Figure 8B:
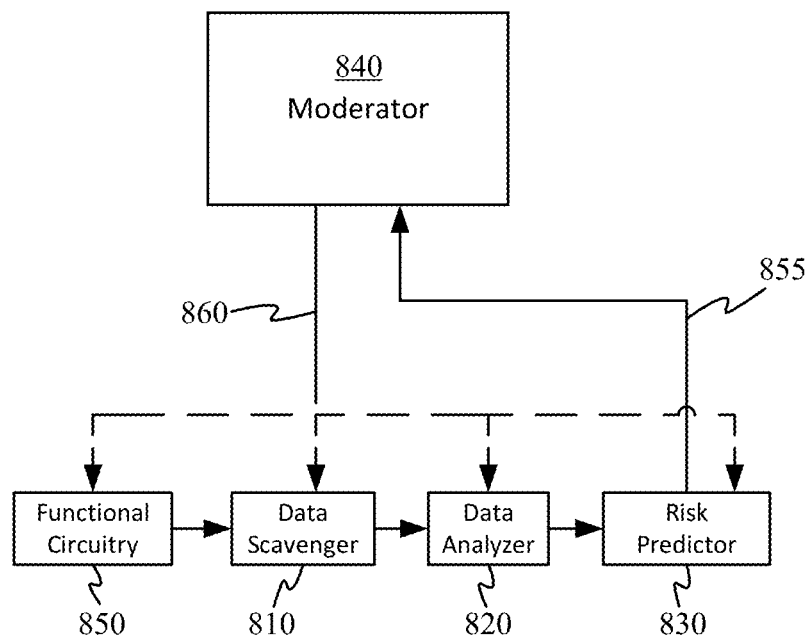
FIGS. 8B-8D illustrate using a moderator to implement a security configuration.
Figure 8D:
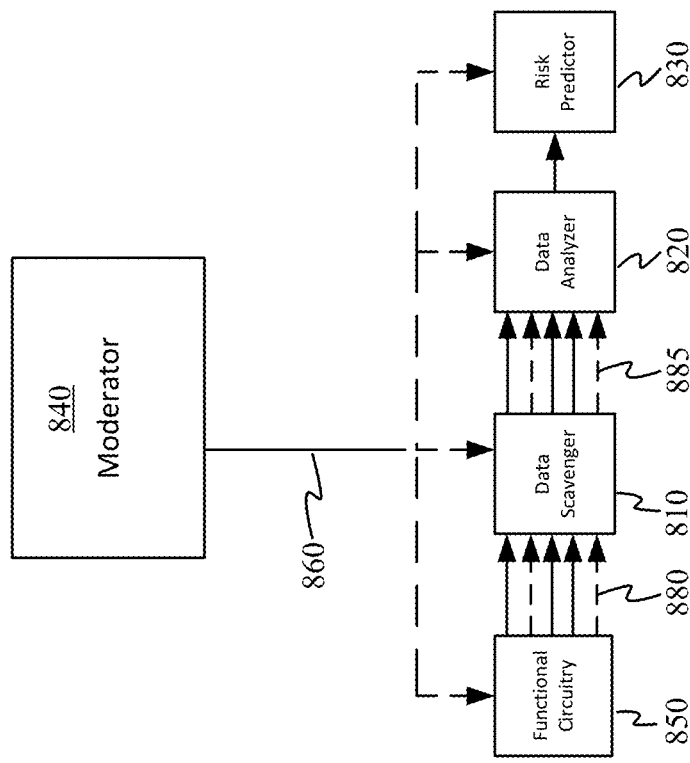
Figure 8C:
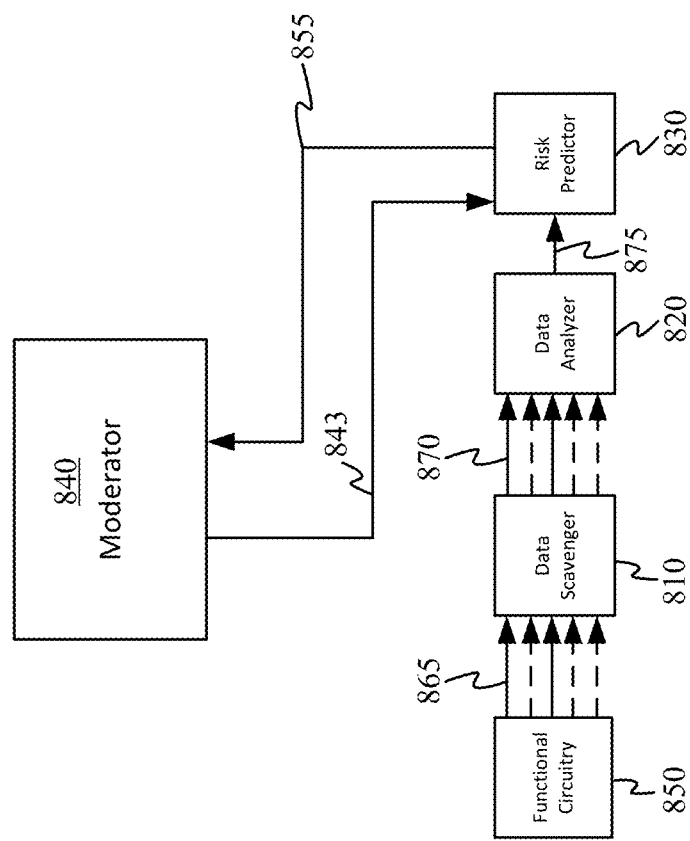

FIG. 8A illustrates communication pathways for a moderator; and FIGS. 8B-8D illustrate using a moderator to implement a security configuration. As previously described, a security analytics framework 800 can be implemented with a data scavenger 810, data analyzer 820, risk predictor 830 and moderator 840. The moderator 840 can send information or models to the different components within the security analytics framework and receive information from the different components to update the models through, for example, various machine learning/training techniques.

For example, the data scavenger 810 can receive, from the moderator 840, information 841 such as instructions regarding what data to collect from a functional circuit, information about the frequency of data collection, information about the resolution of scavenged data, or information about what information to forward to the data analyzer 820. The data analyzer 820 can receive, from the moderator 840, information 842 such as information about the frequency of analysis or weights for the analysis of data from the data scavenger 810. The risk predictor 830 can receive, from the moderator 840, information 843 such as weights or a model to be used as context to produce a streamlined report (e.g., the risk report) from the output of the data analyzer 820. The weights can be based on a model to interpret the output of the data analyzer into relevant security concerns or diagnostic results. The streamlined report may be a summary, or it may be comprehensive. The risk predictor 830 can include a threat score module 835, which can also receive weights or a model (not shown) from the moderator 840 to output, for example, a value indicating the current threat level. The output of the threat score module 835 may be machine readable, and may in some cases directly feed (not shown) into functional circuitry on the chip or to a higher level system (e.g., the high level monitoring system 105 or operating system 120 of FIG. 1).

In some cases, the moderator 840 can receive the same or an encoded version of the information sent between the other components. In some cases, the information sent to the moderator 840 is information that would not normally be sent from one component to another and is just for the moderator 840. For example, the data scavenger 810 may collect data that is sent solely to the moderator 840 (e.g., as data 844) and not to the data analyzer 820. The moderator 840 can receive the data 844 and the data 845 (or a portion thereof) output to the data analyzer. Similarly, the moderator 840 can receive data 846 from the data analyzer 820 that is not sent to the risk predictor 830 and the data 847 (or a portion thereof) that is otherwise sent to the risk predictor 830. The moderator 840 can also receive output 848 from the risk predictor 830 and even the threat score 849.

Turning to FIG. 8B, as described in FIG. 8A, the moderator 840 can receive input from various components of a security analytics framework, including a data scavenger 810, a data analyzer 820, and a risk predictor 830 in order to update behavioral models (and in some cases work in conjunction with a higher level monitoring system). These components act on one or more blocks of functional circuitry 850. At some point, the moderator 840 can receive (855) operational data from one or more components in the security analytics framework. In the example of FIG. 8B, the risk predictor 830 is specifically communicating with the moderator 840, but embodiments are not limited thereto. At some point after receiving the communication, the moderator 840 can determine that a change to a different security configuration is necessary. This may be on the direction of a higher level system or based upon learned features discovered by the moderator 840. A new security configuration can be determined, and the new security configuration can be communicated (860) to different parts of the system.

Turning to FIG. 8C, a more detailed flow of the security analytics framework can be seen. The data scavenger 810 can be configured to receive a number of types of operational data 865 from the functional circuitry 850. One or more of these can be collected at a given time. For example, as seen in FIG. 8C, the operational data 865 from the functional circuitry 850 is depicted as including five types, but only two are collected by the data scavenger 810 as indicated by the filled lines. In much the same way, the data analyzer 820 can be configured to receive one or more types of operational data 870 from the data scavenger 810. In many cases, the operational data 865 from the functional circuitry 850 will be of the same one or more types as the operational data 870 from the data scavenger 810. However, there are some implementations wherein the data scavenger 810 can capture more types of operational data 865 than does the data analyzer 820. For example, while some types of operational data might not be part of a currently used model in the security analytics framework, they may still be monitored for aberrant activity. The output 875 of the data analyzer is received by the risk predictor 830, which uses the models previously provided as information 843 from the moderator 840 to generate a risk report and other output. In this illustration, the moderator receives (855) information from the risk predictor 830.

Turning to FIG. 8D, based on the operational data and other information received by the moderator 840, a new security configuration can be generated and sent (860) to one or more of the components or the functional circuitry 850. For example, after data is received (855) by the moderator 840, it is possible that a determination is made by the moderator 840 that a new security configuration is needed. After the details of the new security configuration are determined, the moderator 840 can send (860) the new security configuration to the rest of the system. For example, as illustrated in FIG. 8D, the operational data 880 captured from the functional circuitry 850 by the data scavenger 810 and the operational data 885 sent and/or used by the data analyzer 820 are updated. In FIG. 8D, as indicated by the solid arrows, the operational data 880 from the functional circuitry 850 and the operational data 885 from the data scavenger 810 both include data pertaining to three sources.

Other examples of possible results not shown in the figure can include updated models providing different interpretation of operational data in the data analyzer 820 and the risk predictor 830. The behavior of the functional circuitry 850 can also be altered. For example, certain sensitive functions can be ceased. In another implementation, the functional circuitry 850 can begin implementing dummy routines or acting on dummy data to prevent leakage of sensitive content. In another implementation, the functional circuitry 850 can be shut down entirely, for example in the case of a serious attack with a high degree of certainty from the moderator 840.

Figure 9:
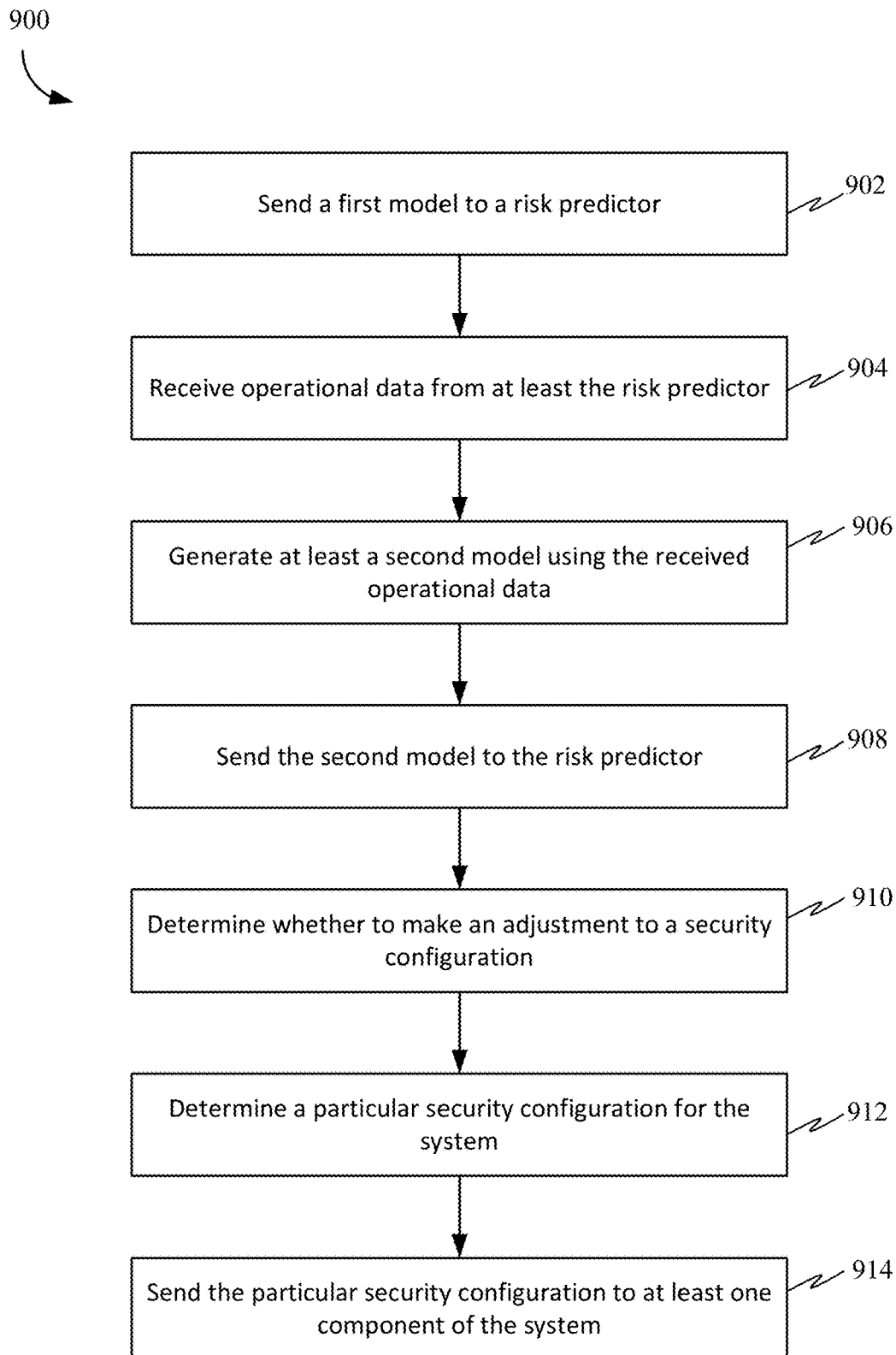
FIG. 9 illustrates a method for providing moderation to a security analytics framework.

FIG. 9 illustrates a method for providing moderation to a security analytics framework. Method 900 can be carried out by a moderator such as moderator 103 described with respect to FIG. 1, moderator 500 described with respect to FIG. 5A, or moderator 840 such as described with respect to FIGS. 8A-8B, and can include sending (902) a first model to a risk predictor for a system. The first model includes context information for a particular application of the system. The system can include a moderator, a data scavenger, data analyzer, a risk predictor, and one or more blocks of functional circuitry. In some cases, a security configuration or instructions based on the first model can be sent to the risk predictor instead of a full model. Multiple models can also be sent to the risk predictor. One or more models, a security configuration, or instructions can also be sent to other components of the system, such as a data scavenger or data analyzer or one or more blocks of functional circuitry within the system.

The moderator can receive (904) operational data from the system (e.g., on-chip data 546 or off-chip data 547 such as described with respect to FIG. 5A). For example, the operational data may be received from any of the components of the system, including, but not limited to the data scavenger, data analyzer, and risk predictor. When the operational data is received from a risk predictor, the operational data can include one or more numeric values that indicate one or more threat scores (e.g., one threat score per potential attack). Data can also be received from a third party, for example, via an API. The data from the third party can be one or more global models (e.g., a model based on an emerging type of attack that hasn't been experienced in the immediate system). The data from the third party can also be a set of instructions based on a global model.

Training can be performed (906) on one or more stored models including the first model using the received operational data to generate at least a second model. The second model can be an improved version of the first model. In some cases, the second model overwrites the first model in memory. In some cases, the first model is preserved and the second model is written to a different location. More than one model can be generated at this stage. For instance, the second model may be intended for the risk predictor; and a third model (or profile) can be generated for the data scavenger or the data analyzer.

The second model can be sent (908) to the risk predictor. The risk predictor can use this model for context when processing results of a data analyzer.

The moderator can determine (910) whether to make an adjustment to a security configuration of the system based on at least the received operational data. The determination can be based on, for example, newly identified threats from the analysis of the operational data or from a third party update. A newly identified threat from the analysis of the operational data may be available because of information received from off-chip sources.

Once the moderator makes a determination that an adjustment to the security configuration of the system, should be made, the moderator can determine (912) a particular security configuration for the system based on at least the received operational data. A security configuration can include one or more models and instructions to be sent to one or more components of the security analytics framework. The security configuration can be a learned configuration generated through machine learning or an inference engine as to appropriate measures for a particular environment and possibly new threat behaviors. There may be different levels of security configurations to match different levels and certainty of a threat's presence and the particular security configuration can be based on certainty of the threat's presence. The moderator can then send (914) the particular security configuration to at least one component of the system. In some cases, the security configuration can also include instructions for one or more blocks of functional circuitry. For example, the moderator may send a configuration signal to a data scavenger to adjust which elements of interest should be sources of data being collected. As another example, the moderator may send an updated model to a data analyzer for the predefined metric used by the data analyzer to identify patterns in the scavenged data. In some cases, if a serious attack is detected or suspected to be underway in the system, the moderator may send a command, directly or via the data analyzer, to shut down entirely to one or more blocks of functional circuitry in an effort to prevent exposure of sensitive information.

FIGS. 10A-10D illustrate an example attack scenario and corresponding response. An operating environment can include functional circuitry 1000 of a system, a data scavenger 1002, a data analyzer 1004, a risk predictor 1006 and a moderator 1008. At least the data scavenger 1002 of the security analytics framework may be included on-chip as part of the system.

Figure 10A:
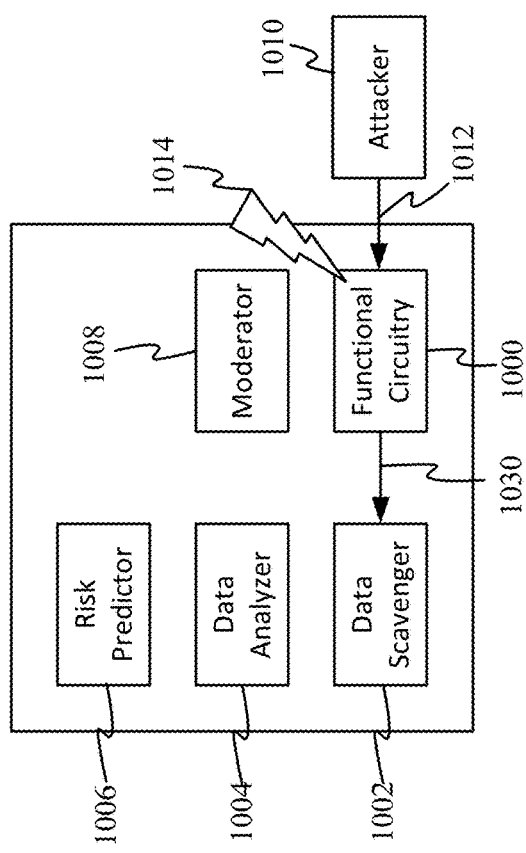
FIGS. 10A-10D illustrate an example attack scenario and a corresponding response.

Referring to FIG. 10A, an attacker 1010 may attempt to extract data from the functional circuitry 1000, for example via a side channel attack 1012 or a fault injection attack 1014. In a side channel attack, the signal lines, power lines, and/or outputs of the circuitry are viewed repeatedly to determine any secret-specific behaviors of the circuitry. In a fault injection attack, the attacker injects one or more errors into the system and analyzes the output in an effort to determine or manipulate the inner workings of the circuitry; for instance, by maliciously setting a processor internal flag to indicate a successful security check, independent of the result of the actual check.

Figure 10B:
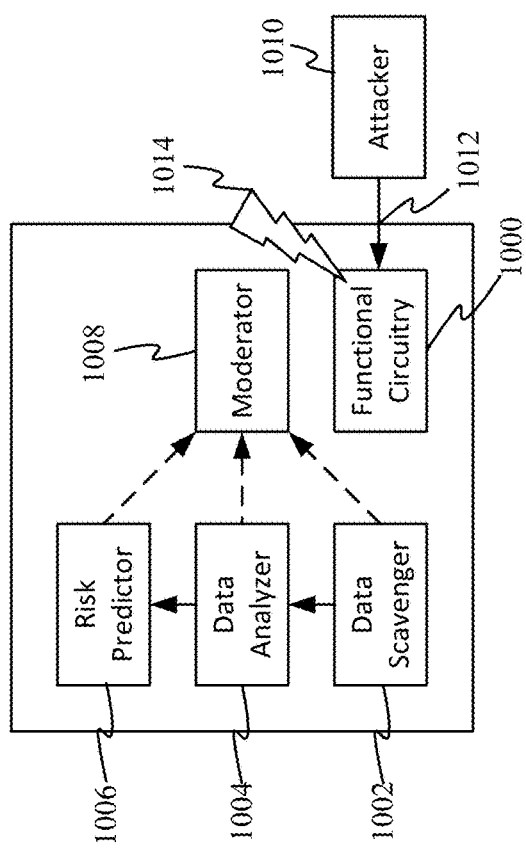

Referring to FIG. 10B, at some point (if not continually or continuously), possibly during the attack 1012, 1014, the data scavenger 1002 collects (1030) data from the functional circuitry 1000. The collecting (1030) of the data can occur as described with respect to FIGS. 1 and 2.

Figure 10C:
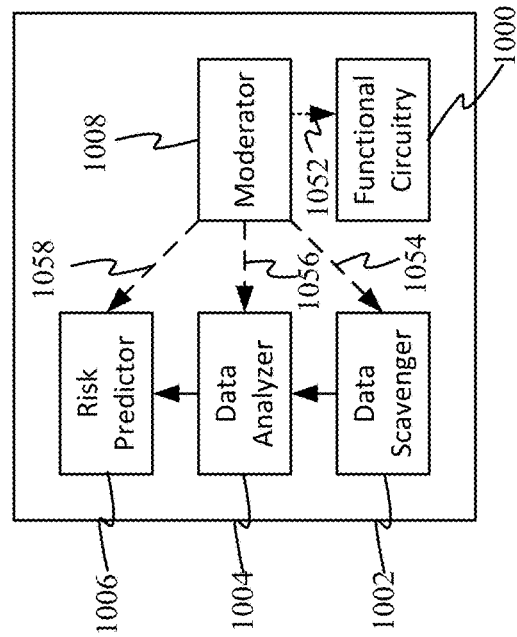

Turning to FIG. 10C, the data scavenger 1002 can communicate information collected from the functional circuitry 1000. The information can be communicated (1040) to the data analyzer 1004 as described in FIGS. 1, 2, and 3. The information from the data scavenger 1002 can also be communicated (1042) directly to the moderator 1008 as observational data. At some point, after the data analyzer 1004 finishes analysis of some or all the data, the output of the data analyzer 1004 can be communicated (1044) to the risk predictor 1006. The output of the data analyzer 1004 can also be communicated (1046) directly to the moderator 1008. In addition, if the data analyzer identifies the attack from the current risk policy, the data analyzer may initiate the appropriate threat response. In addition to, or as an alternative, the risk predictor 1006 may trigger the appropriate response. In particular, the risk predictor 1006 can use a previously received (from the moderator 1008) use-case specific behavioral model to process the output of the data analyzer 1004 and output the results to a higher level (not shown) or another component in the framework, such as described in FIGS. 1 and 4. In some cases, the results of the risk predictor 1006 can be communicated (1048) to the moderator 1008. It is possible that the data analyzer 1004 and risk predictor 1006 do not identify a behavior indicative of the attack. However, the moderator 1008 is able to take advantage of its intelligence and supplement or update the system.

Figure 10D:
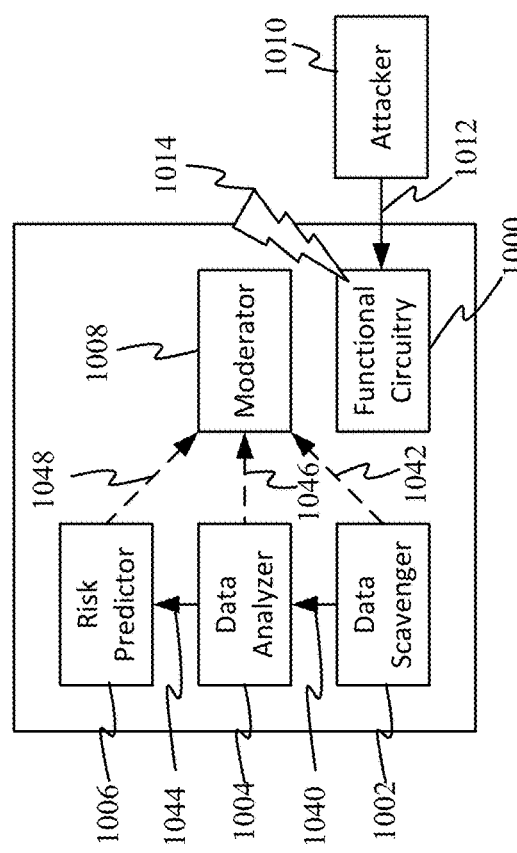

Turning to FIG. 10D, after the moderator 1008 receives the operational data, the moderator 1008 may generate a new model and determine whether to make an adjustment to the security configuration of the system. The moderator 1008 can communicate the new model or set of instructions to other components. In some cases, the functional circuitry 1000 receives (1052) instructions from the moderator 1008—for instance, the moderator 1008 may itself determine that the observational data indicates an attack is occurring and send the functional circuitry 1000 a signal to shut down permanently or until the attack is over or otherwise dealt with. The functional circuitry 1000 could be sent garbage data to process or implement a dummy routine. In some cases, the data scavenger 1002 receives (1054) a configuration signal from the moderator 1008. The configuration signal can indicate new data to collect from the functional circuitry 1000, new data to forward to the data analyzer 1004, or other instructions. In some cases, the data analyzer 1004 receives (1056) instructions or a model from the moderator 1008. The instructions can include new predefined metric(s) to apply to the data received from the data scavenger 1002, new data to forward to the risk predictor 1006, or other instructions. In some cases, the risk predictor 1006 receive (1058) the new model from the moderator 1008 and instructions to re-process the data received from the data analyzer 1004. In some cases, observational data collected from the system under attack may not be processed by the moderator 1008 in time to protect that system from the attack, but can be used to update models sent to other, similar systems.

Figure 11:
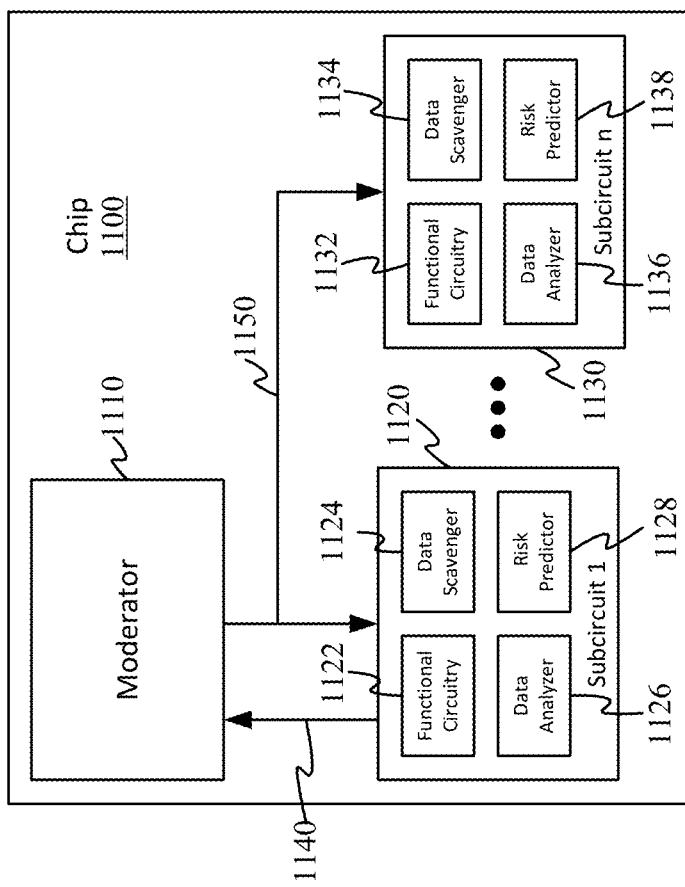
FIG. 11 illustrates an example analytic framework for a system with multiple subcircuits.

FIG. 11 illustrates an example analytic framework for a system with multiple subcircuits. Referring to FIG. 11, a chip 1100 can include a moderator 1110, a first subcircuit 1120 coupled to the moderator 1110, and at least one other subcircuit 1130 coupled to the moderator 1110. Each subcircuit can include a number of components within the subcircuit, including functional circuitry 1122, 1132 data scavenger 1124, 1134, a data analyzer 1126, 1136, and a risk predictor 1128, 1138. It is possible that one or more of these components may not be present in an immediate subcircuit (e.g., the one or more components may be in a different part of the chip or may be off-chip). In the same manner, the moderator 1110 may be off-chip, so long as it is coupled in some way to the first subcircuit 1120 and the at least one other subcircuit 1130. There are two subcircuits depicted, but it should be noted that there could be more than two.

At some point, the moderator 1110 can receive (1140) observational data from the first subcircuit 1120. The data may originate from the data scavenger 1124, the data analyzer 1126, the risk predictor 1128, or more than one of these components. After receiving the data, the moderator 1110 may determine a new security configuration. The security configuration can include instructions to alter behavior in the functional circuitries 1122, 1132, the data scavengers 1124, 1134, the data analyzer 1126, 1136, or the risk predictor 1128, 1138.

The moderator 1110 can then communicate (1150) the new security configuration to the first subcircuit 1120. At this time, the moderator 1110 can also communicate (1150) the new security configuration to the at least one other subcircuit 1130, in doing so communicating the new security configuration to a subcircuit that otherwise might still be vulnerable to an attack that happened to the first subcircuit. Similarly, it is possible that an attack originates on the at least one other subcircuit 1130 and data is communicated to the moderator 1110 from that attack, causing the moderator 1110 to communicate to both the at least one other subcircuit 1130 and the first subcircuit 1120.

Figure 12:
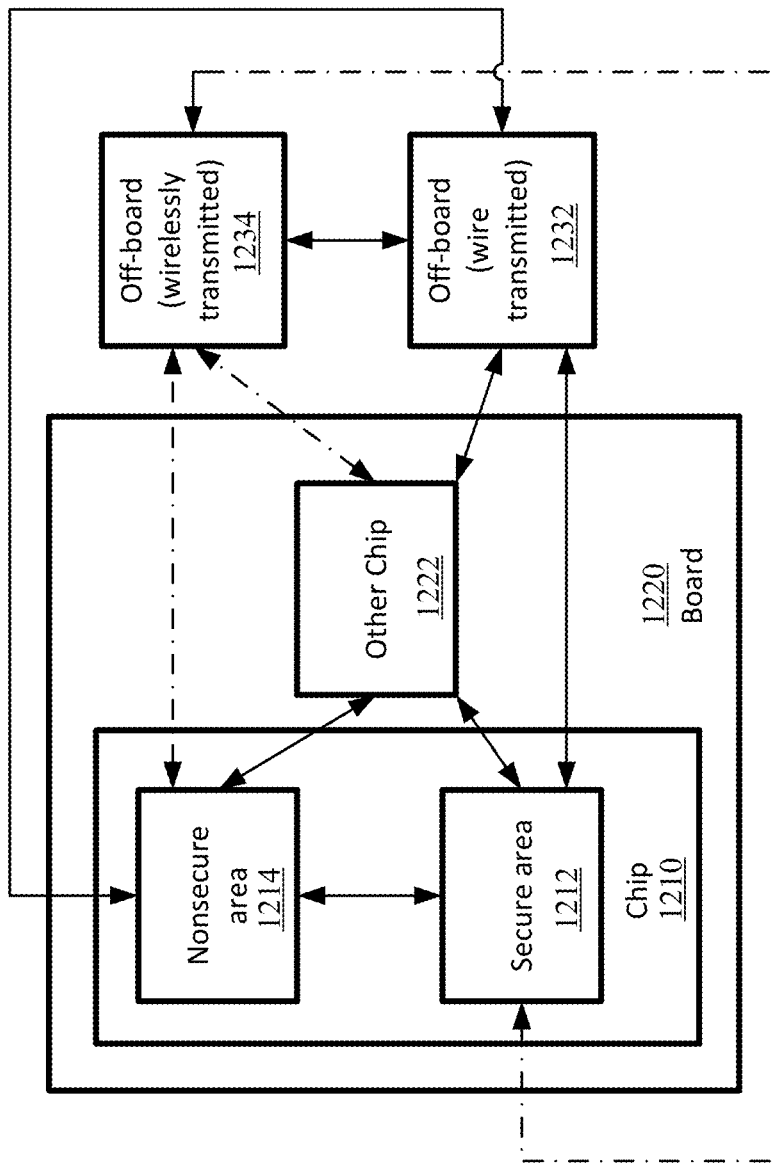
FIG. 12 illustrates examples of communication between different parts of a system incorporating a security analytics framework that may be in different locations or have different secure states.

FIG. 12 illustrates examples of communication between different parts of a system incorporating a security analytics framework that may be in different locations or have different secure states. A system can include a chip 1210 with a secure area 1212 and a nonsecure area 1214. The system can further include a board 1220 on which both the chip 1210 and another chip 1222 is located. The system can also include off-board circuitry, including off-chip circuitry 1232 available via wired transmission mechanisms and off-chip circuitry 1234 available via wireless transmission mechanisms.

As an example, a data scavenger and data analyzer may be in the secure area 1212 on chip while a risk predictor may be in a nonsecure area 1214 on chip. A moderator may be housed off of the chip 1210 on the other chip 1222. The moderator may further communicate data, including data from the secure analytics framework, to external sources. In some cases, the moderator may be on chip 1210 or on any system on a chip with at least one secure domain for sensitive information or cryptographic functions.

Communication between a secure area 1212 on chip and a nonsecure area 1214 on chip can have some element of security applied. The security involved can include existing obfuscation methods, such as sending out irregular signals, padding data, use of dummy routines or dummy data, or traditional encryption methods. Different security methods can be used for different types of data. Communication between a secure area 1212 on chip or a nonsecure area 1214 on chip and the other chip 1222 can use similar or different security methods. Communication involving an off-board wire-connected circuitry 1232 or an off-board wirelessly connected circuitry 1234 can be configured to be more secure, using more traditional encryption and fewer obfuscation methods.

In some cases, because bandwidth may be limited when transferring information from one component to another in the security analytics framework when moving from a secure area to a non-secure area on the chip or from the chip to another chip on the same board or even to other chips/boards that can be accessible via wired or wireless communications, certain features of the analysis are performed closer to the functional circuitry being monitored and/or encoding of information is performed so that the size of a message from one area to another is reduced.

Figure 13:
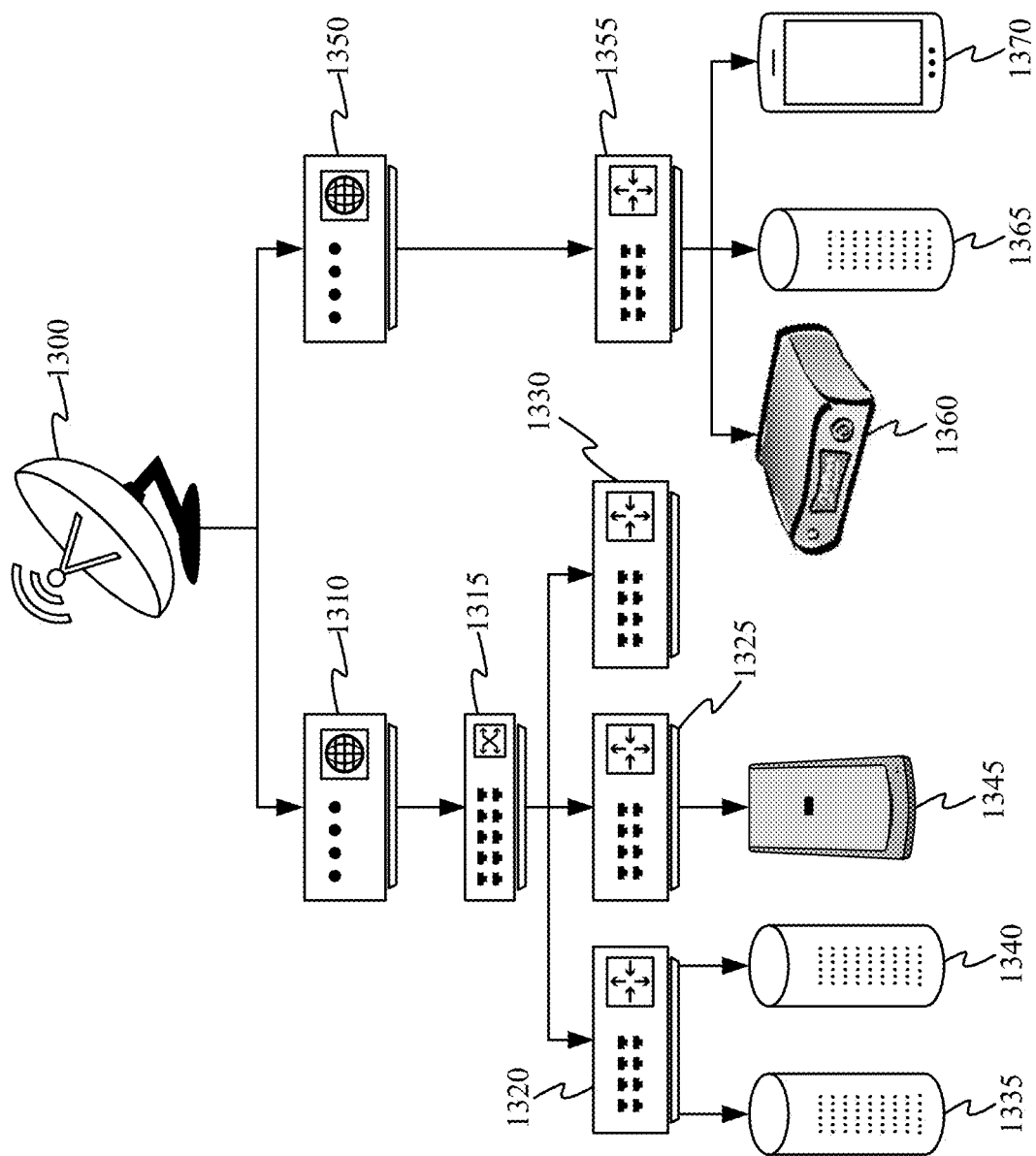
FIG. 13 illustrates an example implementation involving a network.

FIG. 13 illustrates an example implementation involving a network. A network distributor can have a local source 1300 that distributes to multiple modems 1310, 1350. Each modem can have one or more routers connected to the modem, each of which can have one or more devices connected to the router. A security analytics framework can be implemented throughout a hierarchy of the network to detect threats and provide safeguards to the entire network.

Source 1300 can provide internet access to two modems, a business modem 1310 and a personal modem 1350. The business modem 1310 can be connected with three routers, a public router 1320, a payment router 1325, and an employee router 1330 via a firewall or switch 1315. Two smart speakers 1335, 1340 can be connected to the public router 1320. A payment processing device 1345 can be connected to the payment router 1325. In this case, there is no device currently connected to the employee router 1330. The personal modem 1350 can be connected to a personal router 1355, through which three personal devices: set top box 1360, smart speaker 1365, and mobile phone 1370 can be connected.

Each modem 1310, 1350 and router 1320, 1325, 1330, 1355 can be equipped with a security analytics framework. For example, a moderator system can be implemented as part of any network component or as a standalone network component. Several devices can be configured to have security analytics frameworks as well, although since some are for customers or possibly guests, it is difficult to enforce this. From all devices, modems, and routers with a security analytics framework, operational data can be collected that is considered local. The operational data can be communicated as described in FIG. 12 to a moderator housed at the source 1300. The moderator housed at the source 1300 can be configured to collect and analyze all of the operational data provided to it and determine a security configuration for the entire network based on the local operational data, including one or more different subconfigurations for the different types of devices, modems, and routers.

Thus, when a problem is identified in one region, signals can be sent to help protect others. For example, if an attack is detected at the personal router 1355, information can be updated to other routers, including public router 1320 or other of the routers on the network. In addition, because patterns can be detected over a wider network, the security analytics framework can identify an issue that may not be discernable at only one level.

Although the subject matter has been described in language specific to structural features and/or acts, it is to be understood that the subject matter defined in the appended claims is not necessarily limited to the specific features or acts described above. Rather, the specific features and acts described above are disclosed as examples, implementing the claims and other equivalent features and acts; they are intended to be within the scope of the claims.

What is claimed is:

1. A method to provide moderation to a security analytics framework for a chip or particular integrated circuit (IC), the method comprising:
    sending a first model to a risk predictor of the security analytics framework for the chip or particular IC, wherein the first model includes context information for a particular application of the chip or particular IC;
    receiving operational data of the chip or particular IC;
    performing training on one or more stored models including the first model using the received operational data to generate at least a second model;
    sending the second model to at least the risk predictor;
    determining whether to make an adjustment to a current security configuration of the security analytics framework for the chip or particular IC based on at least the received operational data, wherein the current security configuration comprises a first configuration of one or more elements of interest of a plurality of elements of interest on the chip or particular IC that a data scavenger of the security analytics framework captures, wherein the one or more elements of interest are selectively collected according to the first configuration, and wherein the plurality of elements of interest on the chip or particular IC includes an element of interest captured from a performance counter;
    determining a particular security configuration for the security analytics framework for the chip or particular IC based on at least the received operational data; and
    sending the particular security configuration to at least one component of the security analytics framework for the chip or particular IC, wherein the at least one component comprises the data scavenger, wherein the particular security configuration updates the first configuration to a second configuration of elements of interest of the plurality of elements of interest on the chip or particular IC that the data scavenger captures to provide updated operational data of the chip or particular IC, wherein the elements of interest that are selectively collected is changed in the second configuration according to an updated configuration signal from the particular security configuration.

2. The method of claim 1, wherein receiving the operational data of the chip or particular IC comprises:
    receiving the operational data from at least the data scavenger of the security analytics framework for the chip or particular IC.

3. The method of claim 1, wherein receiving the operational data of the chip or particular IC comprises:
    receiving the operational data from at least a data analyzer of the security analytics framework for the chip or particular IC.

4. The method of claim 1, wherein receiving the operational data of the chip or particular IC comprises:
    receiving the operational data from at least the risk predictor.

5. The method of claim 4, wherein the operational data from the risk predictor comprises a numeric value that indicates a threat score.

6. The method of claim 1, further comprising:
    receiving, by an application programming interface, data from a third party indicating a global model; and
    sending the global model to at least the risk predictor.

7. The method of claim 1, wherein sending the particular security configuration to at least one component of the security analytics framework for the chip or particular IC further comprises sending an updated model to a data analyzer of the security analytics framework for the chip or particular IC, wherein the updated model comprises a predefined metric that the data analyzer uses to identify patterns.

8. The method of claim 1, wherein the updated configuration signal from the particular security configuration is based on the second model.

9. A moderator system to moderate a security analytics framework for a chip or particular integrated circuit (IC), the moderator system comprising:
    a moderator controller;
    an interface for communicating with components of the security analytics framework, the components of the security analytics framework comprising a data scavenger, a data analyzer; and
    a risk predictor; and
    a data resource storing one or more models of particular operations of the chip or particular IC;
    wherein the moderator controller comprises one or more processors and a local storage having instructions stored thereon that when executed direct the moderator system to:
        send, via the interface, a first model to the risk predictor, wherein the first model includes context information for a particular application of the chip or particular IC;
        receive, via the interface, operational data of the chip or particular IC;
        perform training on the one or more stored models including the first model using the received operational data to generate at least a second model;

send, via the interface, the second model to at least the risk predictor;
determine, whether to make an adjustment to a current security configuration of the security analytics framework for the chip or particular IC based on at least the received operational data, wherein the current security configuration comprises a first configuration of one or more elements of interest of a plurality of elements of interest on the chip or particular IC that the data scavenger captures, wherein the one or more elements of interest are selectively collected according to the first configuration, and wherein the plurality of elements of interest on the chip or particular IC includes an element of interest captured from a performance counter;
determine a particular security configuration for the security analytics framework for the chip or particular IC based on at least the received operational data; and
send, via the interface, the particular security configuration to at least one component of the components of the security analytics framework, wherein the at least one component comprises the data scavenger, wherein the particular security configuration updates the first configuration to a second configuration of elements of interest of the plurality of elements of interest on the chip or particular IC that the data scavenger captures to provide updated operational data of the chip or particular IC wherein the elements of interest that are selectively collected is changed in the second configuration according to an updated configuration signal from the particular security configuration.

10. The moderator system of claim 9, further comprising:
an encoder and decoder for encoding and decoding sensitive data transmitted and received via the interface.

11. The moderator system of claim 9, further comprising:
an update model application programming interface (API), wherein the update model API receives a model from a third party to update a particular component of the security analytics framework for the chip or particular IC.

12. The moderator system of claim 9, further comprising:
a data API, wherein the data API provides the received operational data to a third party.

13. The moderator system of claim 9, wherein the instructions to send the particular security configuration to at least one component of the components of the security analytics framework direct the moderator system to:
send an updated model to the data analyzer, wherein the updated model comprises a predefined metric that the data analyzer uses to identify patterns.

14. The moderator system of claim 9, wherein the chip or particular IC is in a network component.

15. The moderator system of claim 9, wherein the chip or particular IC is a system on a chip with at least one secure domain for sensitive information or cryptographic functions.

16. The moderator system of claim 9, wherein the chip or particular IC comprises an integrated Services Identity Module (iSIM).

17. The moderator system of claim 9, wherein the chip or particular IC is in a set top box.

18. The moderator system of claim 9, wherein the updated configuration signal from the particular security configuration is based on the second model.

* * * * *